US006220292B1

(12) United States Patent
Woodling et al.

(10) Patent No.: US 6,220,292 B1
(45) Date of Patent: Apr. 24, 2001

(54) CRANE-MOUNTED CONCRETE PUMP APPARATUS

(75) Inventors: Roger M. Woodling; Anthony E. Bond, both of Omaha, NE (US)

(73) Assignee: Glazer Enterprises, Omaha, NE (US)

( * ) Notice: Subject to any disclaimer, the term of this patent is extended or adjusted under 35 U.S.C. 154(b) by 0 days.

(21) Appl. No.: 09/651,952

(22) Filed: Aug. 31, 2000

Related U.S. Application Data

(63) Continuation-in-part of application No. 09/635,885, filed on Aug. 10, 2000, which is a continuation of application No. 09/548,103, filed on Apr. 12, 2000, now Pat. No. 6,142,180.

(51) Int. Cl.[7] ........................................ B65G 53/32
(52) U.S. Cl. ..................... 137/615; 137/355.16; 141/387
(58) Field of Search .............................. 137/615, 899, 137/355.16, 355.19, 355.2; 141/387, 388

(56) References Cited

U.S. PATENT DOCUMENTS 3,712,330 * 1/1973 Davis ............................ 137/615 X
3,893,480 * 7/1975 Dunbar ............................ 137/615
4,262,696 * 4/1981 Oury ............................ 137/615
4,488,683 * 12/1984 Chiel ............................ 137/355.2 X
4,502,505 * 3/1985 Moller ............................ 137/615
4,708,533 * 11/1987 Leppanen .................... 137/355.16 X
5,823,218 * 10/1998 Schlecht et al. ................. 137/615 X
5,913,323 * 6/1999 Hudelmaier ...................... 137/615 X
6,142,180 * 11/2000 Woodling et al. .................. 137/615

* cited by examiner

*Primary Examiner*—Kevin Lee
(74) *Attorney, Agent, or Firm*—Zarley, McKee, Thomte, Voorhees & Sease; Dennis L. Thomte

(57) ABSTRACT

A crane-mounted concrete pumper has been provided wherein a telescoping boom assembly is pivotally and rotatably mounted on the platform of the truck. A concrete conduit is positioned in the interior of the boom assembly and has its intake end operatively connected to a concrete pump mounted on the truck by means of a flexible concrete hose which is wound upon a rotatable hose reel mounted on the pedestal of the boom assembly for movement therewith. An extension boom is pivotally mounted on the boom assembly and may be pivoted from a folded, inoperative position to an extended position. A concrete conduit is provided in the interior of the extension boom and is placed into communication with the concrete conduit in the boom assembly when the extension boom is in its extended position. The crane may be either used to pump concrete or used in a conventional fashion. An aerial platform is provided on the boom assembly to enable an operator to pump or spray concrete.

7 Claims, 21 Drawing Sheets

CRANE-MOUNTED CONCRETE PUMP APPARATUS

CROSS-REFERENCE TO RELATED APPLICATION

This is a continuation-in-part application of Petitioners' earlier application Ser. No. 09/635,885 filed Aug. 10, 2000, entitled A CRANE-MOUNTED CONCRETE PUMP APPARATUS which is a continuation application of Ser. No. 09/548,103 filed Apr. 12, 2000 now U.S. Pat. No. 6,142,180, entitled A CRANE-MOUNTED CONCRETE PUMP APPARATUS.

BACKGROUND OF THE INVENTION

1. Field of the Invention

This invention relates to a concrete pump apparatus and more particularly to a concrete pump apparatus which is mounted on a truck crane.

2. Description of the Related Art

Concrete is sometimes pumped to locations where it is difficult or impossible for a concrete mixer truck to gain access thereto. Such is the case where concrete is to be poured behind a house or the like where it is impossible to drive the concrete mixer truck. One alternative to such a situation is to use wheelbarrows to transport the concrete to the location where it is to be placed. Another solution has been to utilize a telescoping or articulated boom assembly which is mounted on a truck. In some cases, a concrete pump is positioned on the truck and a concrete conduit, such as a flexible hose, is extended from the pump, along the length of the telescoping boom, at the exterior surface thereof, to a discharge conduit from which the concrete is discharged. The telescoping boom is extended and maneuvered to position the discharge conduit at the proper location. Although concrete pumpers of the type described do work quite satisfactorily, the boom assemblies thereof have no use other than for pumping concrete. In other words, the boom assembly cannot be used as a crane during those times when concrete is not being pumped. If the boom assembly does not have an aerial platform thereon, it is impossible for an operator to be therein for pumping and spraying concrete. Usually, the spraying of concrete is called shotcrete. Shotcrete is the spraying of concrete on wire mesh for texturing surfaces similar to stucco. If one does not have an aerial lift, then the person must walk on scaffolding and manhandle the hose to shotcrete. To the best of applicants' knowledge, the invention disclosed in the parent application, Ser. No. 09/548,103, is the only aerial lift unit that allows a person to pump concrete from the aerial platform.

In the above-identified parent patent application, a flexible hose extends between the discharge side of the concrete pump and the rearward end of the concrete conduit positioned within the telescopic boom assembly. The flexible hose is coiled on the crane platform when not in use. As the telescopic boom is extended, the flexible hose is pulled from the coil into the interior of the boom assembly. When the boom assembly is retracted, it is necessary to pull the hose rearwardly from the interior of the boom assembly and position the same on the crane platform. Although the apparatus disclosed in the above-identified application performs exceptionally well, the instant invention overcomes the need to coil the flexible hose on the crane platform.

SUMMARY OF THE INVENTION

A crane-mounted concrete pump apparatus is provided with the apparatus being mounted on a truck having a rotatable pedestal assembly mounted thereon rearwardly of the cab of the truck. A telescoping boom assembly is pivotally secured to the pedestal and extends outwardly and normally upwardly therefrom. A hydraulic cylinder pivotally connects the telescoping boom assembly to the pedestal for pivotally moving the telescoping boom assembly with respect to the pedestal. The telescoping boom assembly preferably comprises an outer boom section, an intermediate boom section slidably mounted in the interior of the outer boom section, and an inner boom section slidably mounted in the interior of the intermediate boom section.

A concrete conduit is positioned in the interior of the boom assembly and has an intake end positioned adjacent the rearward end of the boom assembly and a discharge end positioned at the outer end of the boom assembly. A concrete pump is mounted on the truck and is operatively connected to the intake end of the concrete conduit by means of a flexible hose for supplying concrete to the concrete conduit. The flexible hose connecting the concrete pump with the concrete conduit within the boom assembly is wound upon a powered hose reel rotatably mounted on the rearward end of the boom assembly. The outer end of the boom assembly has conventional crane attachments mounted thereon such as hoist cable pulleys, aerial platform, etc., so that the apparatus may be used as a conventional crane when the apparatus is not being used to pump concrete. The provision of the aerial platform on the outer end of the boom assembly also permits an operator to spray or pump concrete from the aerial platform. An elongated extension boom section is pivotally mounted at the side of the boom assembly and may the pivotally moved from an inoperative stored position to an extension position wherein one end of the extension boom is in abutting relationship with the outer end of the boom assembly with the longitudinal axis of the extension boom being parallel to the longitudinal axis of the boom assembly. The concrete conduit is preferably positioned in the interior of the extension boom, but may be mounted on the exterior thereof if desired, and has an intake end in communication with the discharge end of the concrete conduit in the boom assembly and has a discharge end positioned at the outer end of the extension boom so that concrete may be placed considerable distances from the truck or at considerable heights above the truck. As the boom assembly is extended, the flexible hose is unwound from the hose reel. As the boom assembly is retracted, the hose reel is rotated to wind the flexible hose thereon.

It is therefore a principal object of the invention to provide an improved concrete pumping apparatus.

A further object of the invention is to provide a crane-mounted concrete pump apparatus.

Still another object of the invention is to provide a crane-mounted concrete pump apparatus wherein the telescoping boom assembly thereof may be used as a crane during those times when concrete is not being pumped.

Yet another object of the invention is to provide a crane-mounted concrete pump apparatus wherein an aerial platform is provided on the boom assembly to enable an operator to pump or spray concrete from the aerial platform.

Still another object of the invention is to provide a crane-mounted concrete pump apparatus wherein concrete conduit is positioned within the interior of a telescoping boom assembly.

Still another ob ect of the invention is to provide a crane-mounted concrete pump apparatus wherein a concrete conduit is positioned on the telescoping boom assembly and wherein a flexible hose interconnects a concrete pump and the concrete conduit with the flexible hose being wound on a hose reel mounted on the inner end of the boom assembly.

Still another object of the invention is to provide a crane-mounted concrete pump apparatus wherein a concrete conduit is positioned on the telescoping boom assembly and wherein a flexible hose interconnects a concrete pump and the concrete conduit with the flexible hose being wound on a hose reel mounted on the inner end of the boom assembly with the hose reel being powered by a hydraulic motor which may be placed in a "freewheeling" condition as the flexible hose is being unwound therefrom as the boom assembly is being extended.

Still another object of the invention is to provide a crane-mounted concrete pump apparatus including an extension boom which may be stored in a folded position adjacent the side of the telescoping boom assembly thereof when the extension is not needed, but which may be pivotally moved to a position wherein it forms an extension of the telescoping boom assembly.

These and other objects will be apparent to those skilled in the art.

DESCRIPTION OF THE PREFERRED EMBODIMENT

Figure 1:
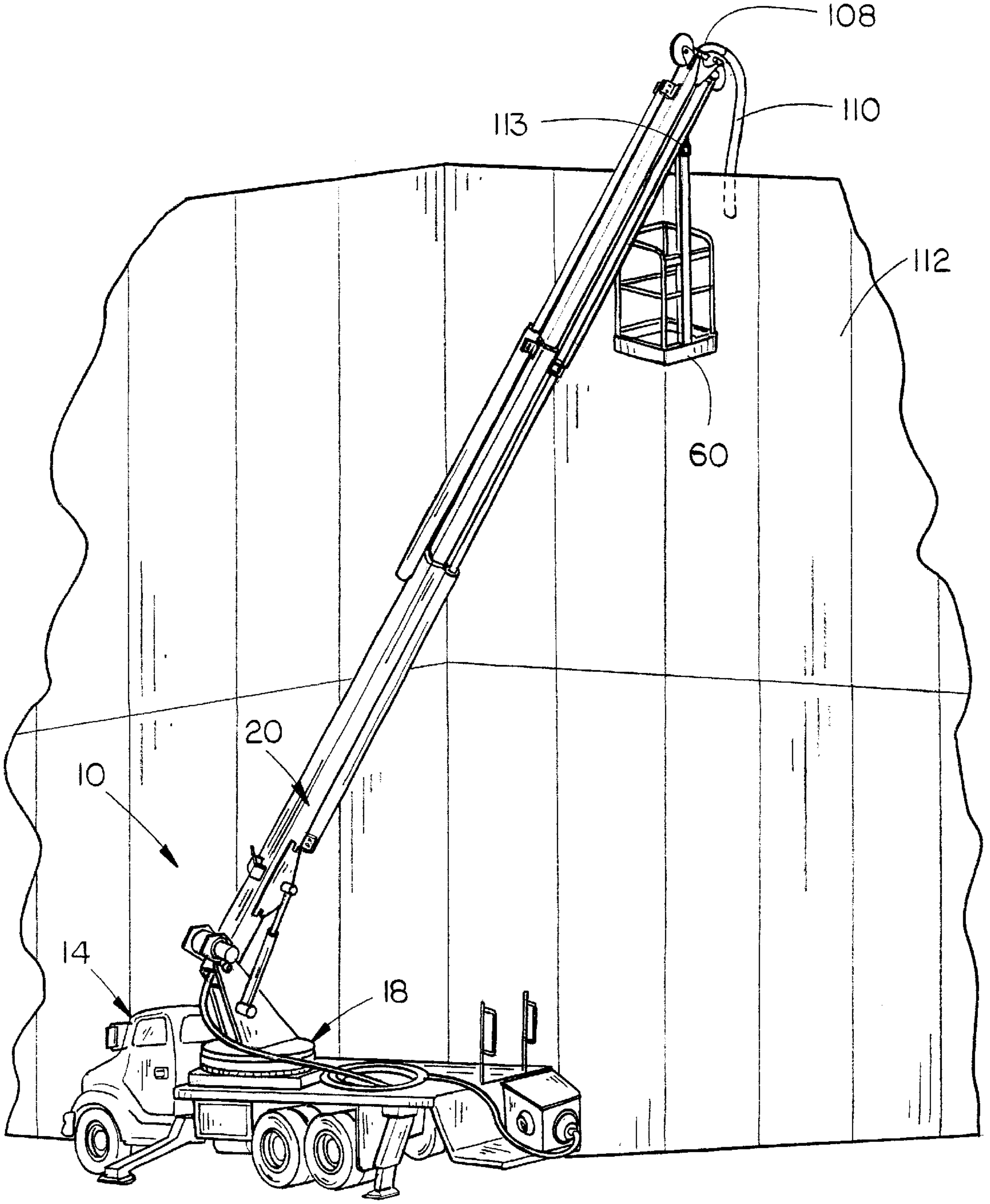
FIG. 1 is a perspective view illustrating the apparatus of the parent application pumping concrete through the upper end of a vertical form.

FIGS. 1–14 illustrate the apparatus of the parent application Ser. No. 09/548,103 filed Apr. 12, 2000, entitled A CRANE-MOUNTED CONCRETE PUMP APPARATUS. The apparatus of the instant invention is illustrated in FIGS. 15–22 and is identical to the apparatus of FIGS. 1–14 except that a hose reel is mounted on the rearward or inner end of the telescoping boom assembly. Inasmuch as the apparatus of FIGS. 15–22 has many identical components to the apparatus of FIGS. 1–14, the reference numerals on FIGS. 15–22 will be the same as those used in FIGS. 1–14 where appropriate.

Figure 2:
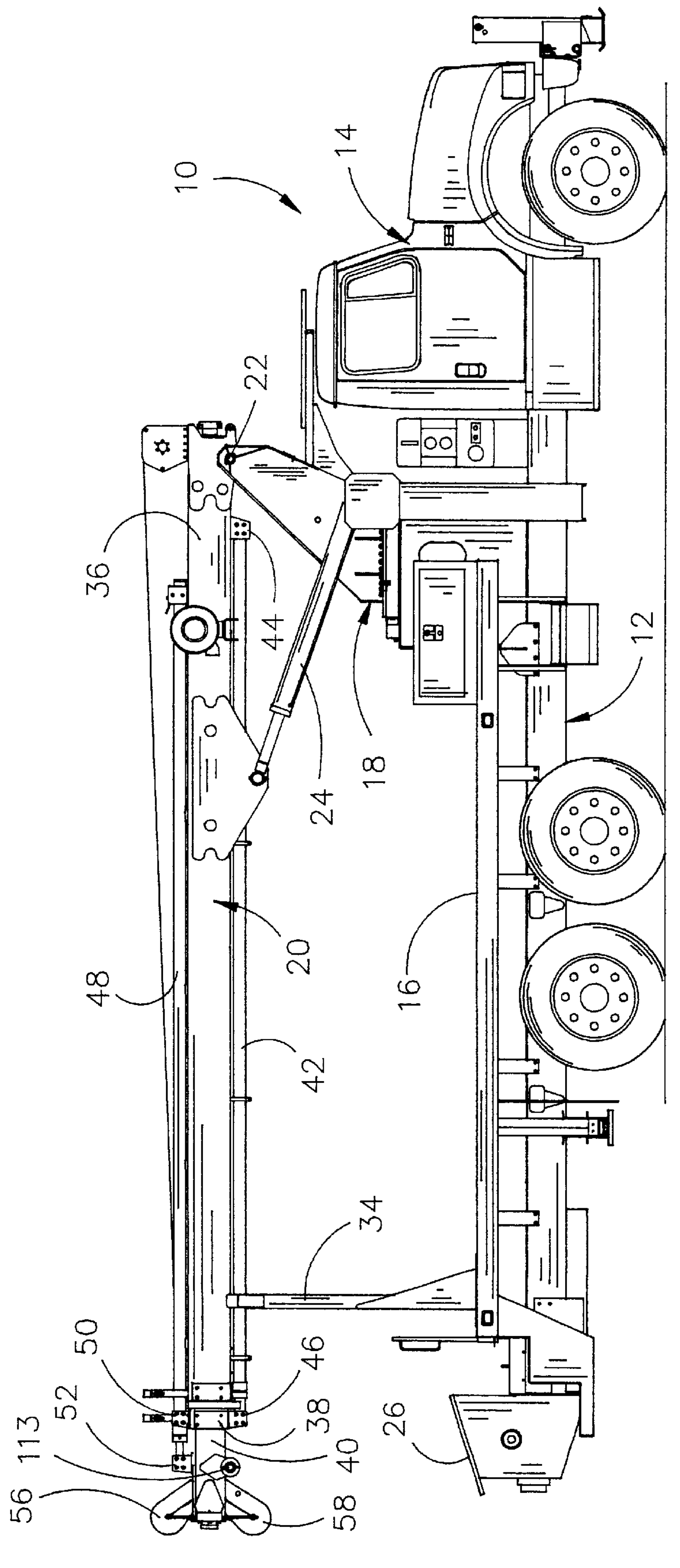
FIG. 2 is a side view of the apparatus of the parent application with the boom assembly thereof being in its retracted and folded position.
Figure 3:
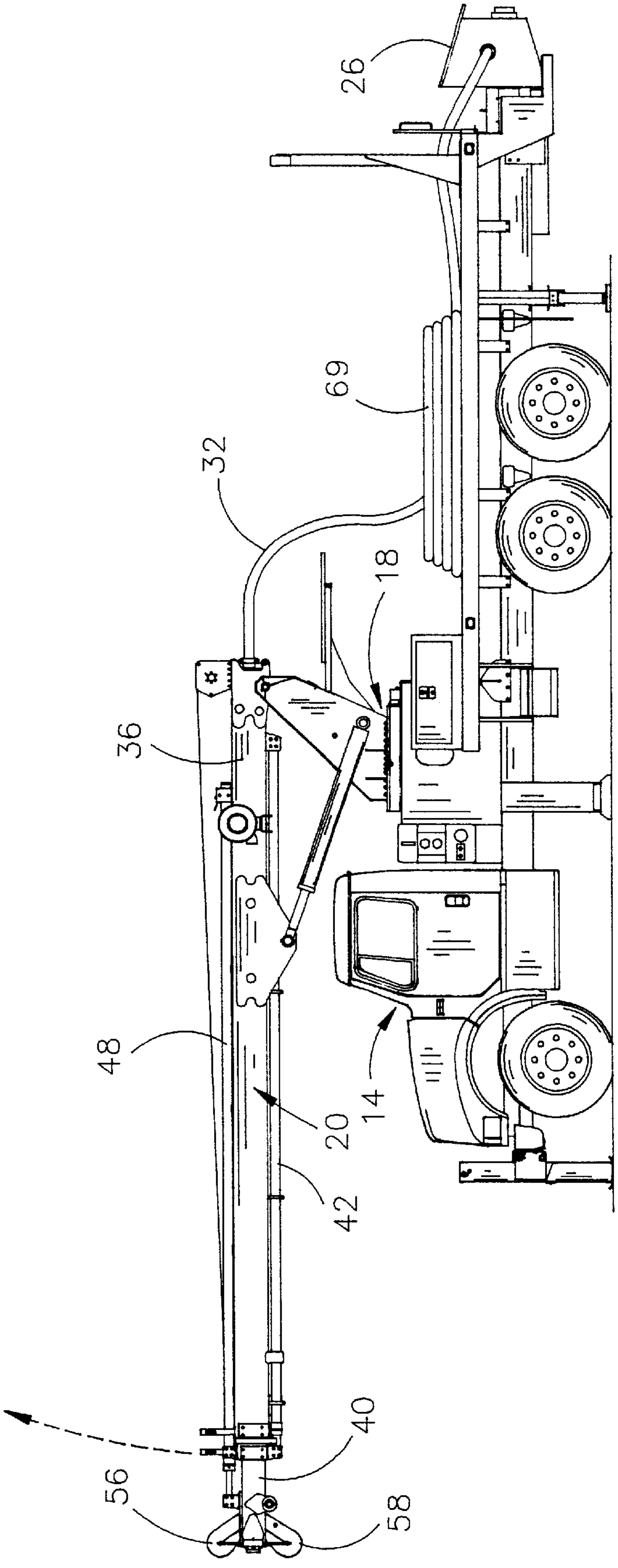
FIG. 3 is a side view of the apparatus of FIG. 2 taken from the left side of the vehicle illustrating the boom assembly thereof pointing forwardly of the truck.
Figure 4:
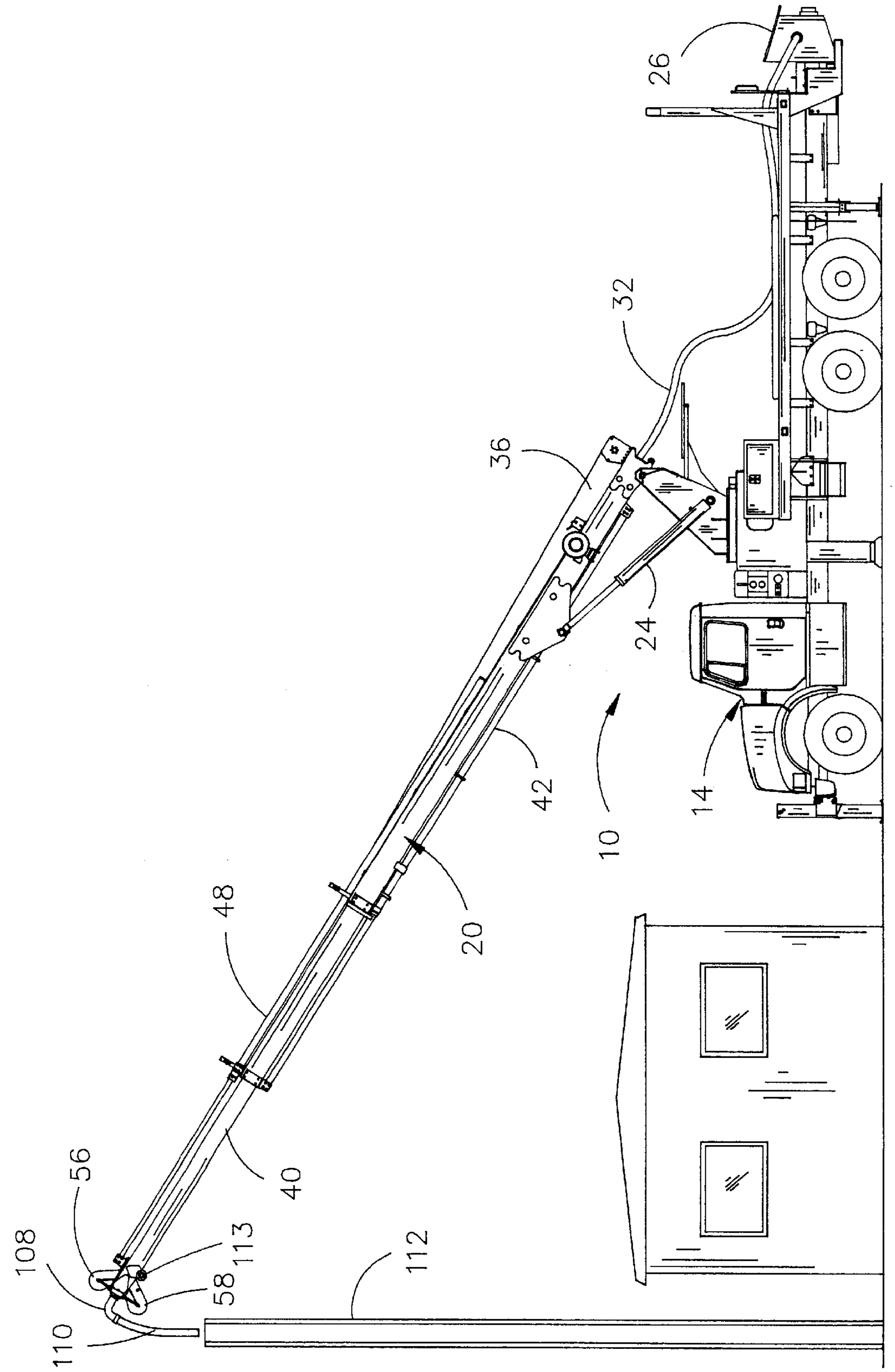
FIG. 4 is a side view similar to FIG. 3 illustrating the telescoping boom assembly having been raised and extended from the position of FIG. 3 to enable concrete to be pumped to the upper end of a concrete form.

Referring to FIGS. 1–14, the numeral 10 refers to a truck including a wheeled frame means 12 and a cab 14 mounted at the forward end thereof. Platform 16 is provided at the rearward end of the truck 10 which is positioned rearwardly of conventional crane pedestal 18 which is rotatably mounted on the truck in conventional fashion. The numeral 20 refers generally to the a telescoping boom assembly which is pivotally mounted at the upper end of the pedestal 18 at 22 and which has a hydraulic cylinder 24 extending therebetween for pivotally moving the boom assembly 20 relative to the pedestal 18. A conventional concrete pump 26 is mounted at the rear end of the truck and has a discharge conduit 28 extending therefrom. Concrete pump 26 includes a pivotal lid which is opened so that concrete may be supplied to the interior of the pump 26 in conventional fashion. The numeral 32 refers to a flexible hose or tube having one end thereof operatively connected to the discharge conduit 28 of the concrete pump 26. Boom assembly 20 rests upon support 34 in conventional fashion when the boom assembly 20 is in its lowered position as illustrated in FIG. 2.

Boom assembly 20 includes an outer boom section 36, the rearward end of which is operatively pivotally secured to the pedestal 18 at 22, an intermediate boom section 38 slidably received by the outer end of boom section 36, and an inner boom section 40 which is slidably received by the outer end of the intermediate boom section 38. While the invention preferably includes an outer boom section, an intermediate boom section, and an inner boom section, more or less boom sections could be utilized, depending upon the needs of the particular owner.

Hydraulic cylinder 42 has its rear end secured to the underside of outer boom section 36 at 44 and has its rod end secured to intermediate boom section 38 at 46. The body of hydraulic cylinder 48 is secured to intermediate boom section 38 at 50 and has its rod end connected to inner boom section 40 at 52. The body of the hydraulic cylinder 48, rearwardly of connection 50, slidably rests upon supports 54 which are secured to the upper surface of outer boom section 36 to enable the body of the hydraulic cylinder 48 to slidably move outwardly with respect to outer boom section 38 as intermediate boom section 38 is extended with respect to outer boom section 36. When cylinder 42 is extended, intermediate boom section 38 slidably moves outwardly with respect to outer boom section 36. The outward movement of intermediate boom section 38 with respect to outer boom section 36 also inner boom section 40 to move outwardly with intermediate boom section 38. If it is desired to extend inner boom section 40 with respect to intermediate boom section 38, hydraulic cylinder 48 is extended which causes inner boom section 40 to move outwardly with respect to intermediate boom section 38. During the extension of inner boom section 40 from intermediate boom section 38, the body of the hydraulic cylinder 48 slidably moves on the supports 54 as previously described. The outer end of inner boom section 40 is provided with conventional hoist cable mechanisms 56 and 58 to enable the apparatus to be used as a conventional crane when concrete is not being pumped. A basket or aerial platform 60 may be pivotally secured to the outer end of inner boom 40 at 113 to enable the apparatus to be used in conventional fashion should a basket be required to lift personnel to a desired location. The aerial platform 60 also enables an operator to be positioned therein to enable the operator to pump or spray concrete from the hose 110.

Figure 5A:
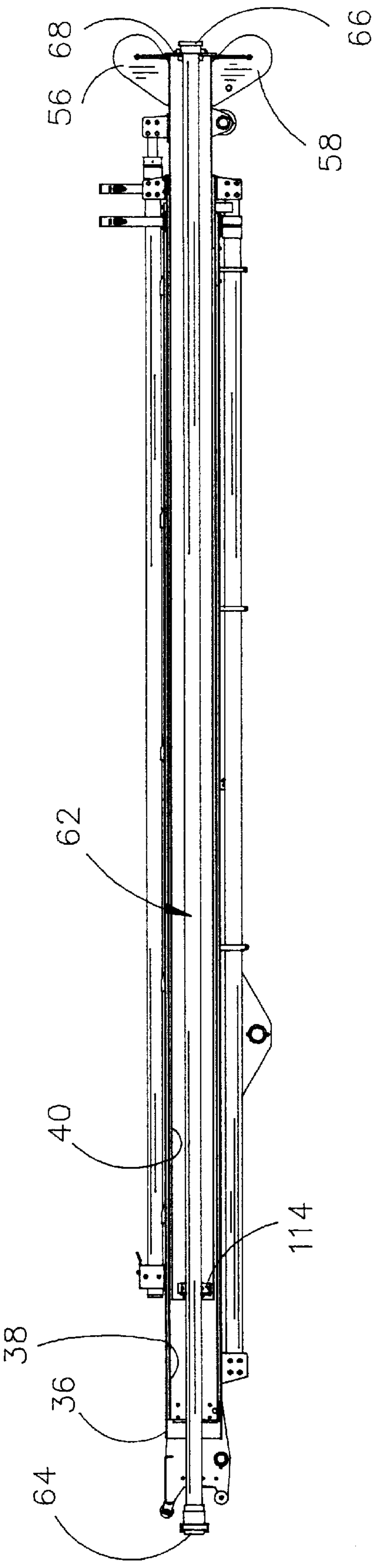
FIG. 5A is a side longitudinal sectional view of the boom assembly of FIG. 1 in its retracted position.
Figure 5B:
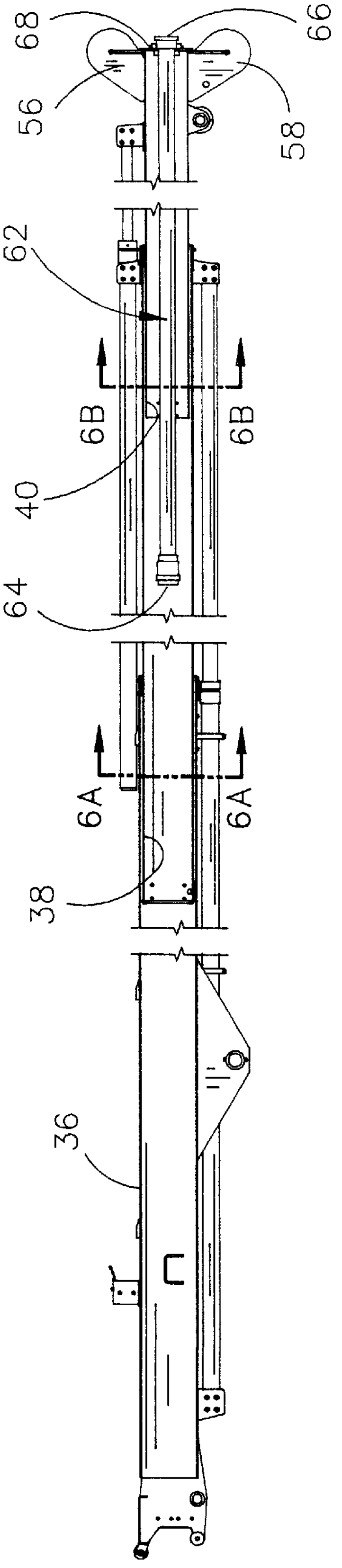
FIG. 5B is a view similar to FIG. 5A except that the intermediate and inner boom sections have been moved towards their extended positions.
Figure 6B:
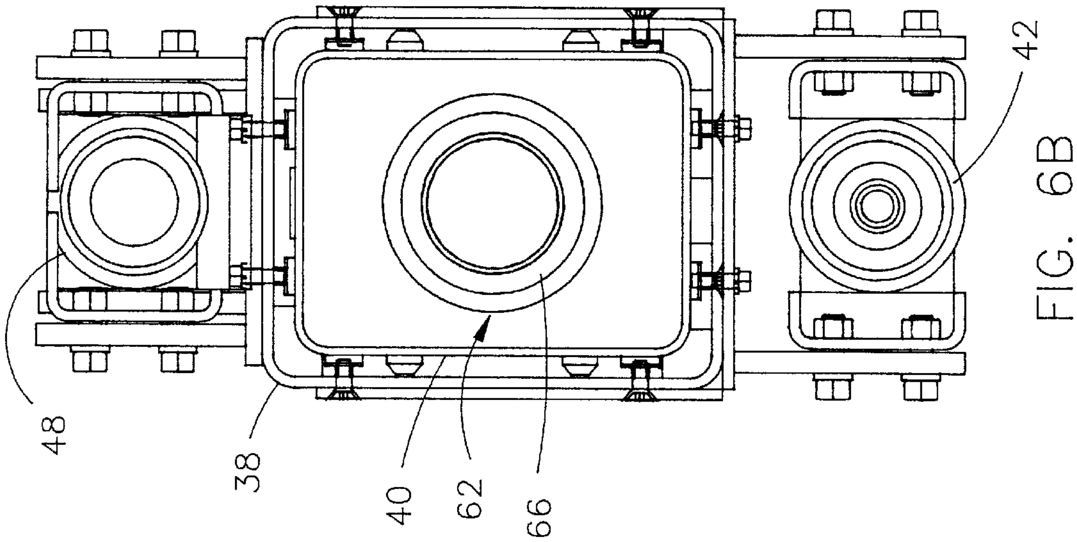
FIG. 6B is a sectional view as seen on lines 6B—6B of FIG. 5B.
Figure 6A:
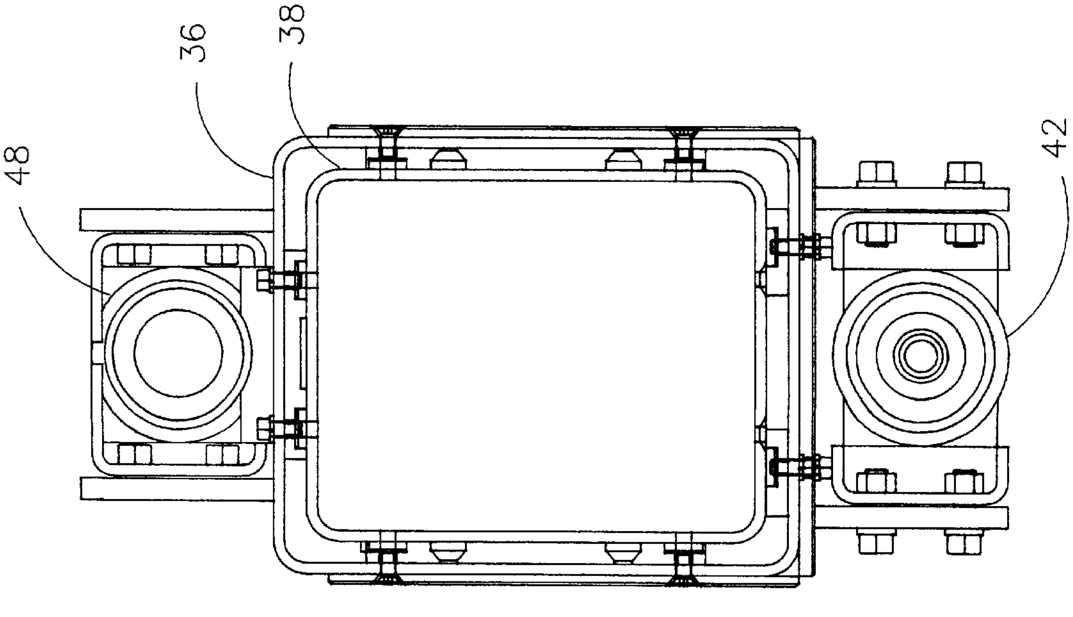
FIG. 6A is a sectional view as seen on lines 6A—6A of FIG. 5B.
Figure 7:
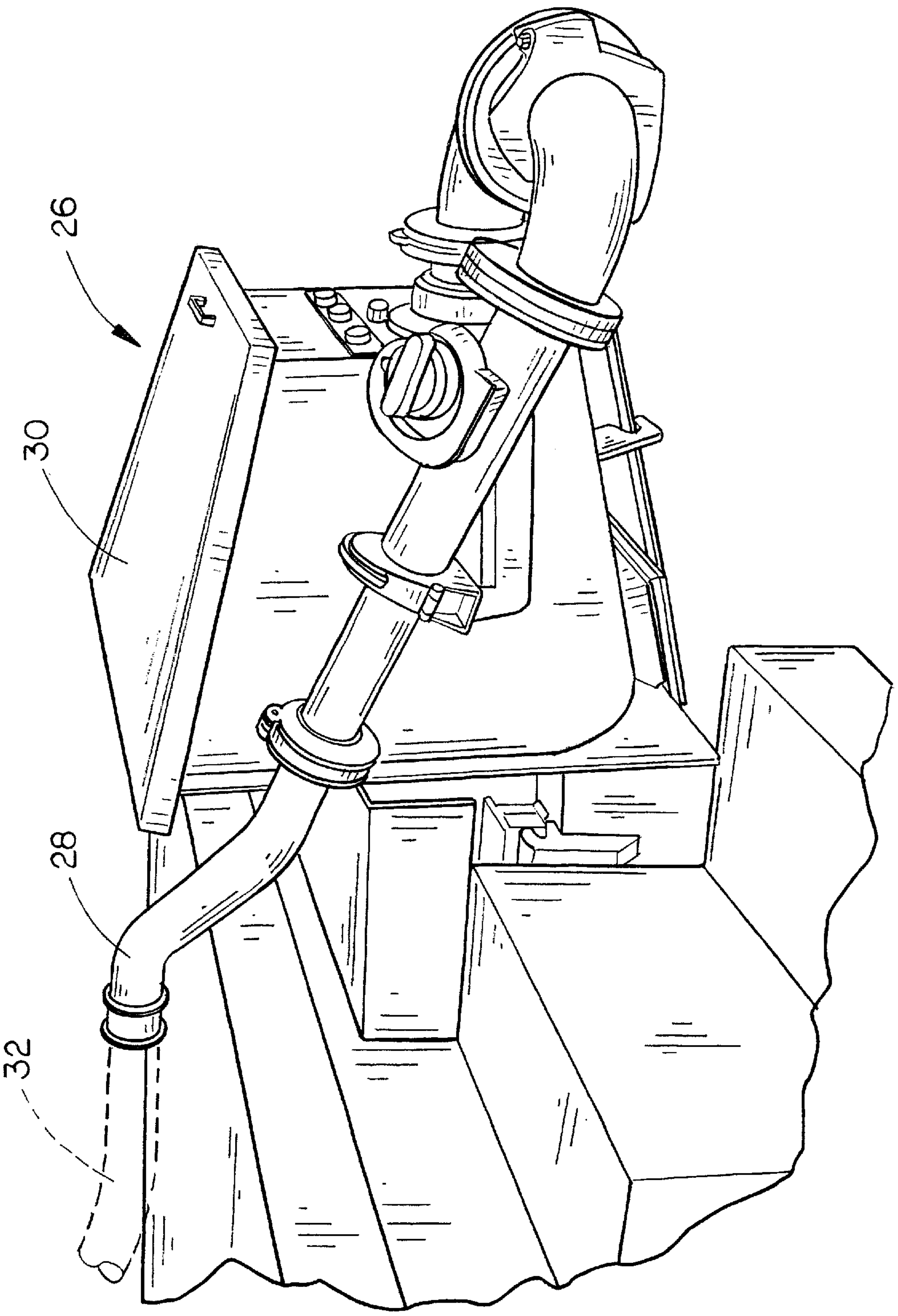
FIG. 7 is a partial rear perspective view of the concrete pump of the parent application which is mounted at the rear of the truck.
Figure 8:
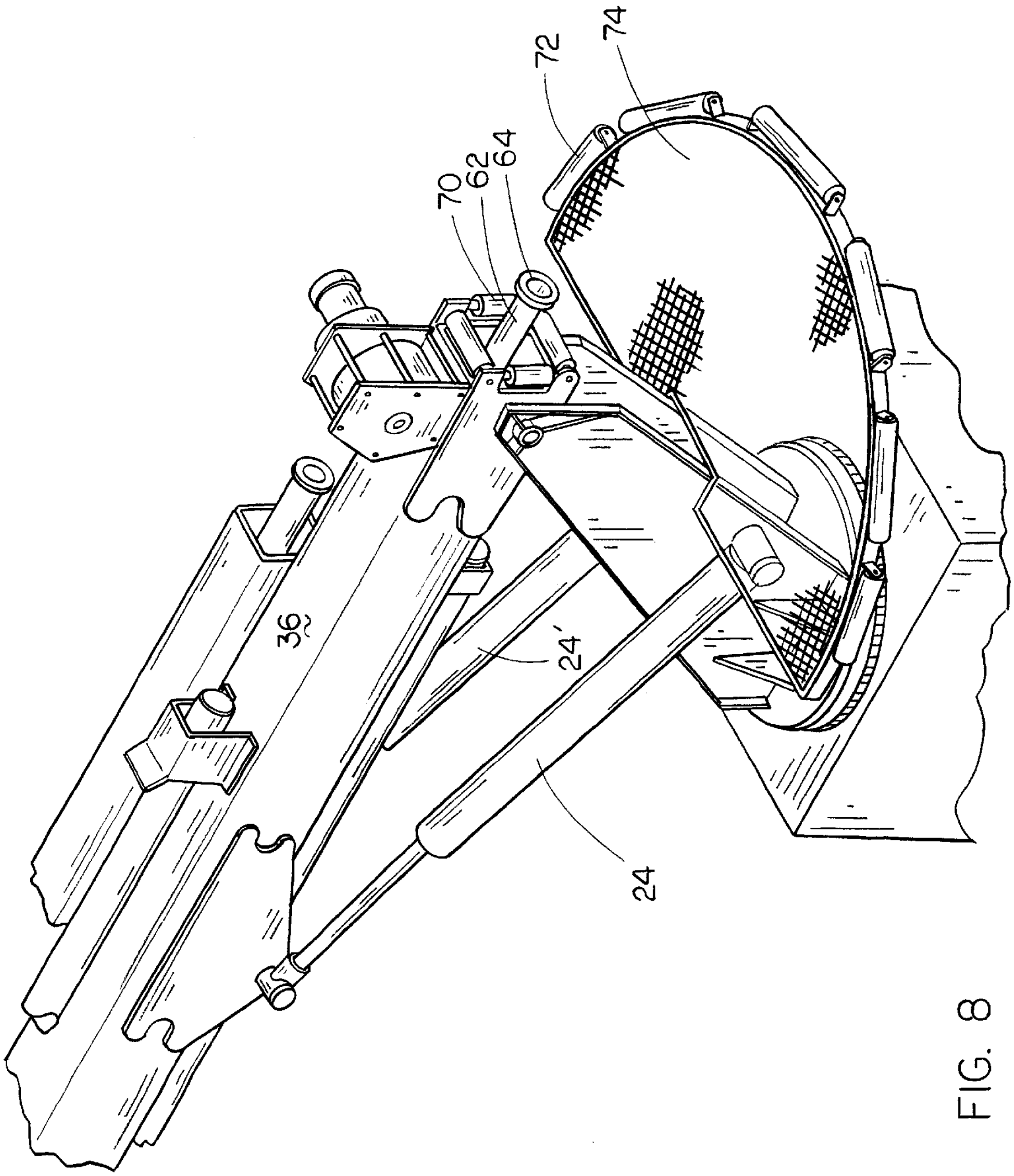
FIG. 8 is a partial rear perspective view of the boom assembly of the parent application.

The numeral 62 refers to an elongated, preferably rigid, concrete conduit which extends through the interior of the boom assembly, as illustrated in FIG. 5A, and has its intake end 64 positioned rearwardly of the rearward end of outer boom section 36. The discharge end 66 of conduit 62 is positioned at the outer end of inner boom section 40 by means of support structures 68 and 114. Thus, extension of inner boom section 40 with respect to either intermediate boom section 38 or outer boom section 36 causes the intake end 64 of conduit 62 to move inwardly into the interior of the boom assembly. The discharge end of hose 32 is connected to the intake end 64 of conduit 62 to supply concrete to the interior of the conduit 62. As the intake end 64 of conduit 62 is moved inwardly into the boom assembly 20, the hose 32 is pulled inwardly into the interior of the boom assembly 20. For that reason, the hose 32 is initially wound into a coil referred to generally by the reference numeral 69 on the platform 16. As the hose 32 is pulled inwardly into the interior of the boom assembly 20, the hose 32 is pulled from the reel 69. To ensure that the hose 32 does not become damaged as it is being pulled into the interior of boom assembly 20, a plurality of rollers 70 are mounted at the inner end of the boom assembly 20, as seen in FIG. 8. Further, a plurality of rollers 72 are rotatably mounted on a semi-circular platform 74 so that the hose 32 may freely pass upwardly from the platform of the truck and into the interior of the boom assembly 20.

Figure 9:
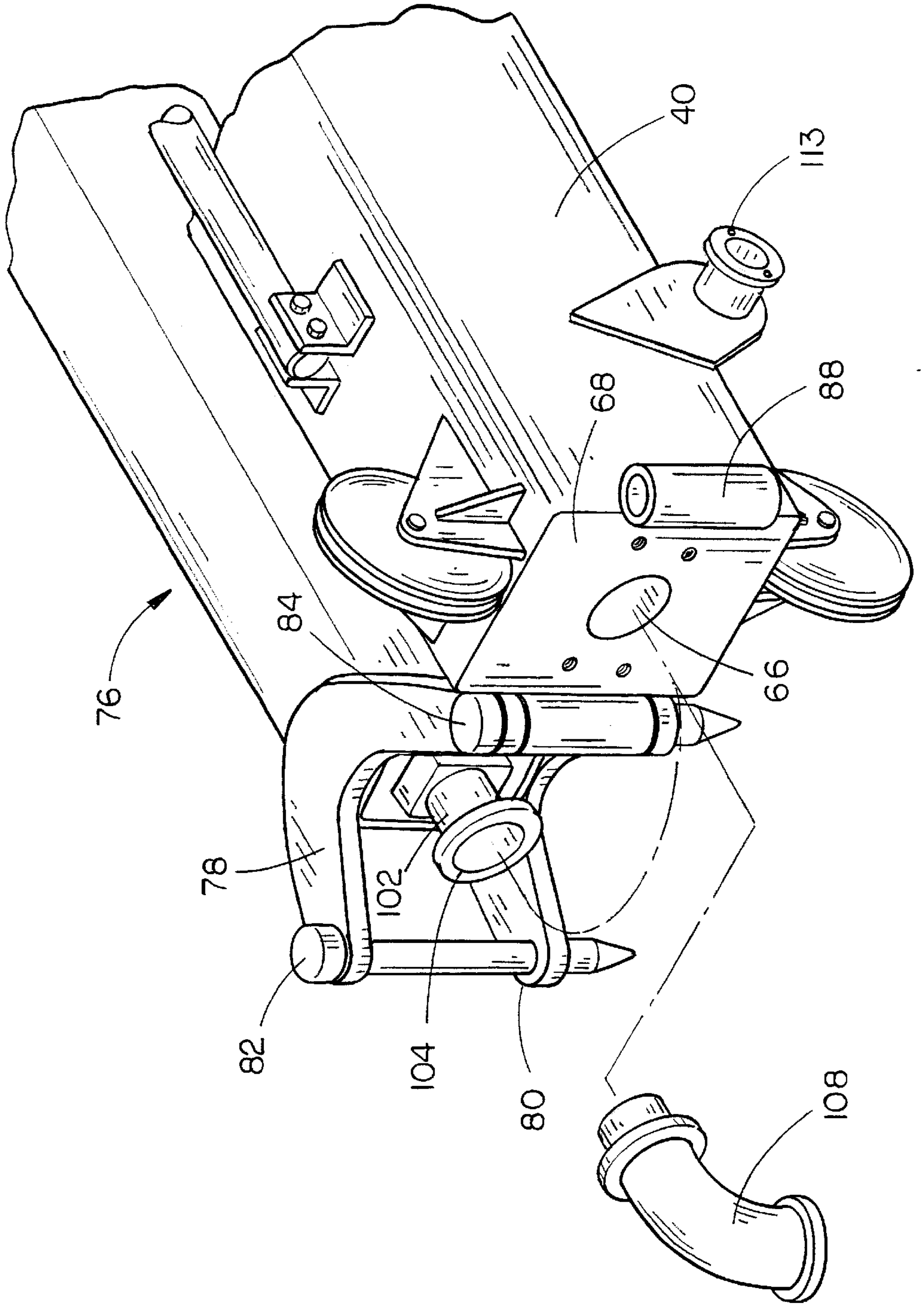
FIG. 9 is a partial front perspective view of the outer end of the boom assembly of the parent application.

The numeral 76 refers to an elongated extension boom having yokes 78 and 80 secured to one end thereof, as seen in FIG. 9. Pins 82 and 84 are adapted to be extended downwardly through openings formed in the free ends of the yokes 78 and 80. As seen in FIG. 9, the forward end of inner boom section 40 has a pair of mounting collars 86 and 88 secured to the forward end thereof. When the boom 76 is in its extended position, pin 82 extends downwardly through yoke 78, collar 88, and through yoke 80 while pin 84 extends downwardly through yoke 78, collar 86, and yoke 80, as seen in FIG. 9, to secure one end of the extension boom 76 to the end of inner boom section 40. Extension boom 76 is provided with longitudinally extending, bullet-shaped arms 90 and 90' which are adapted to be received by receiver 92 secured to the side of intermediate boom section 38 adjacent the forward end thereof. Extension boom 76 is also provided a bullet-shaped arm 94 secured thereto which is adapted to be received by the receiver 96 which is secured to outer boom section 36 adjacent the rearward end thereof. Arm 94 has an opening 98 extending therethrough to enable pin 100 to be extended through receiver 96 and through the arm 94 to maintain arm 94 within receiver 96.

When extension boom 76 is to be pivotally moved to its folded position of FIG. 9, pin 82 is removed from yoke 78, collar 88, and yoke 80 so that boom 76 pivots about pin 84. When extension boom 76 is in its folded position, arm 94 is received by receiver 96 and secured thereto by pin 100 while arms 90 and 90' are received by the receiver 92. Inasmuch as arm 94 is pinned to receiver 96, extension of either intermediate boom section 38 and inner boom section 40 is prevented, since receiver 96 is secured to outer boom section 36. When boom 76 is in its folded and secured position, pin 84 is removed from yoke 78, collar 86, and yoke 80 so that booms 38 and 40 can extend and not interfere with extension boom 76 which is secured to main boom 36.

Figure 10A:
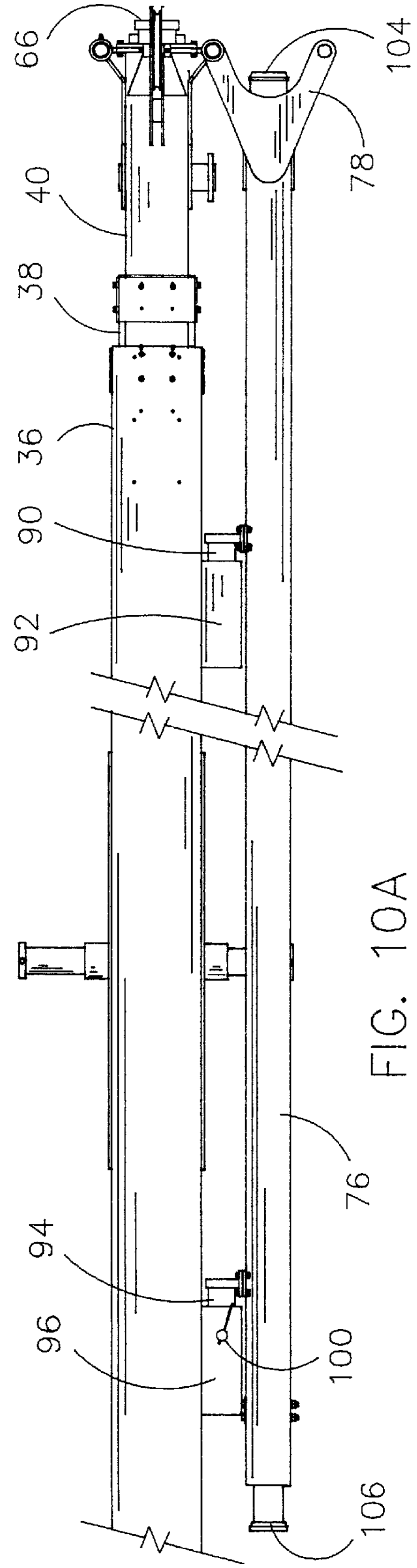
FIG. 10A is a partial top view of the boom assembly of the parent application.
Figure 10B:
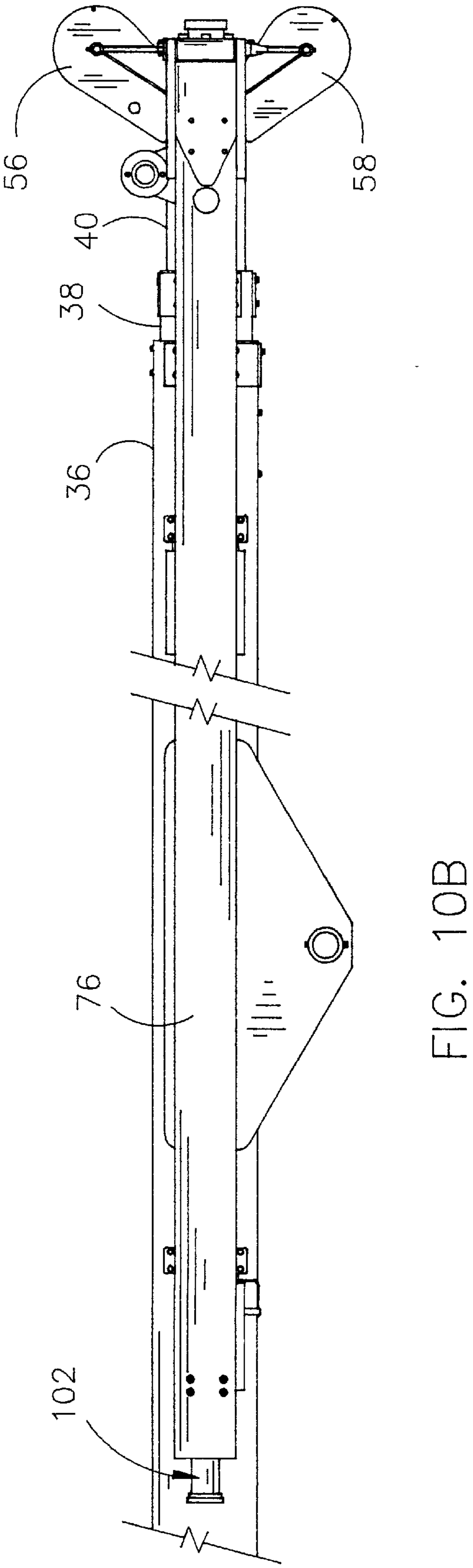
FIG. 10B is a partial side view of the boom assembly of the parent application.
Figures 11A, 11B:
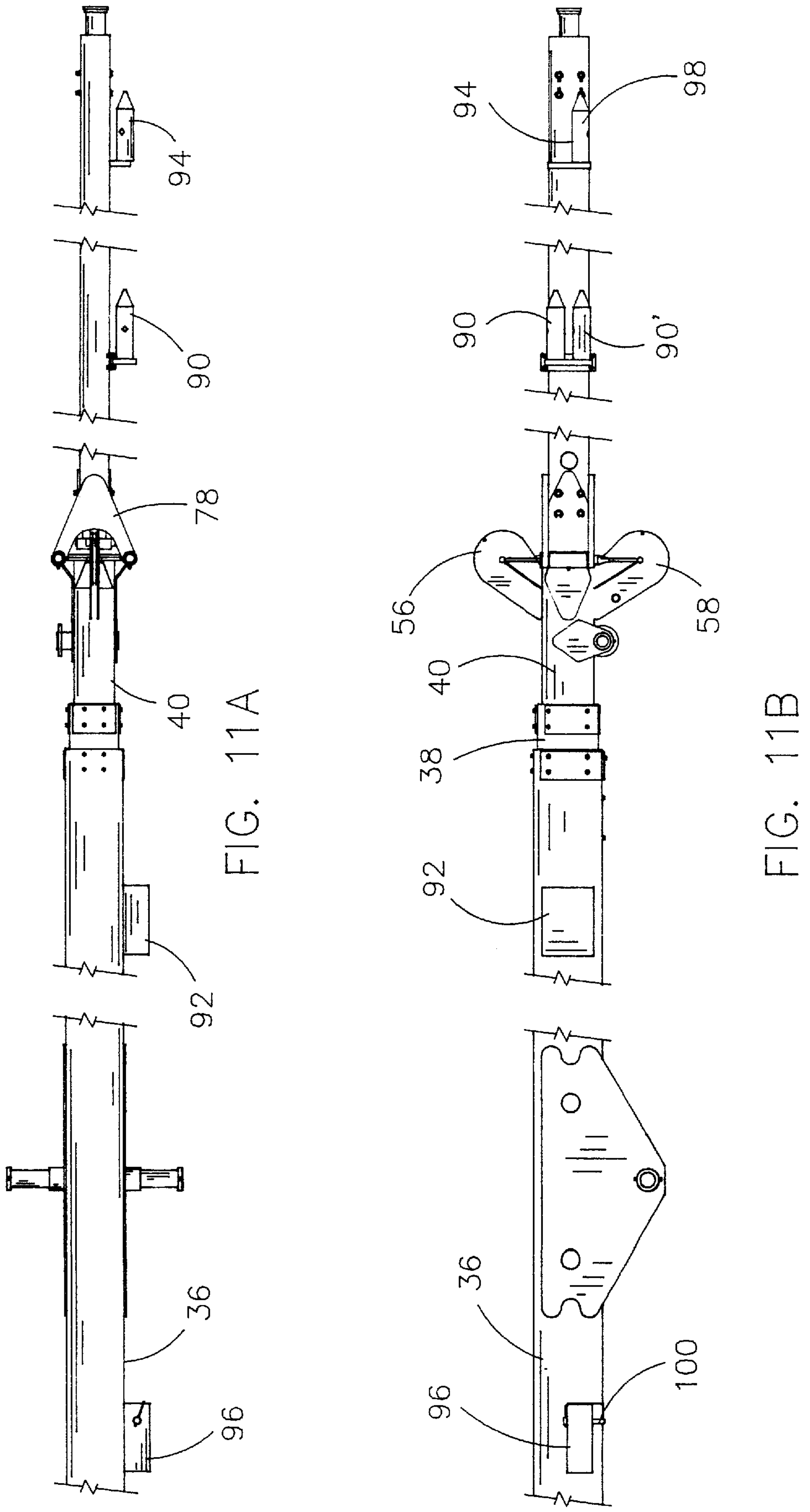
FIG. 11A is a view similar to FIG. 10A except that the extension boom has been pivoted from its folded position to its operative or extended position.
FIG. 11B is a view similar to FIG. 10B except that the extension boom section has been pivotally moved to its extended position.
Figure 12B:
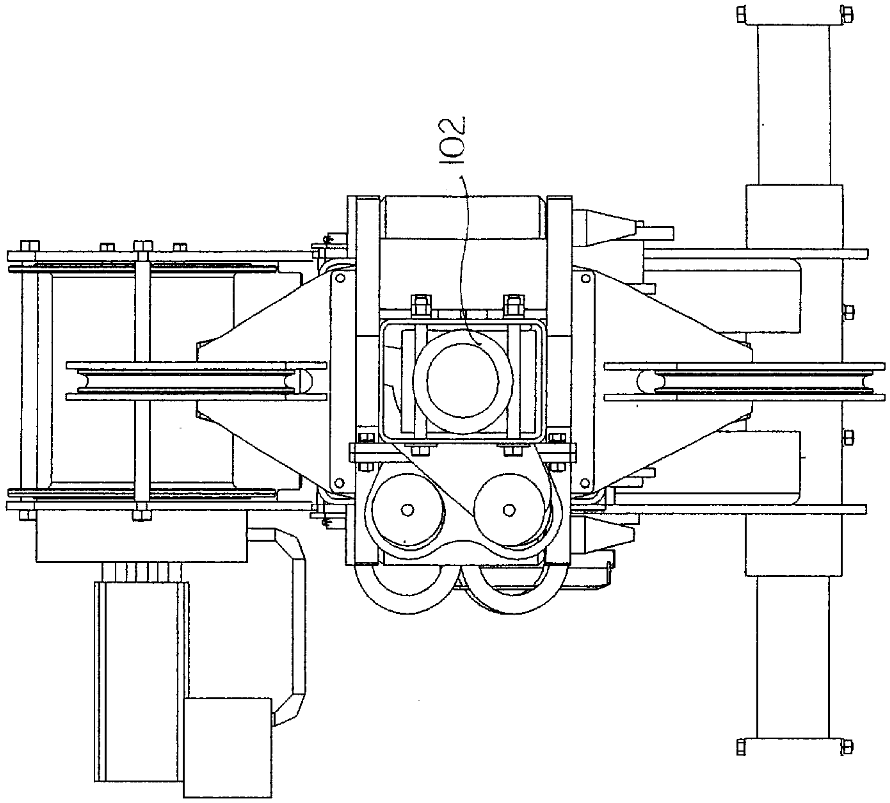
FIG. 12B is a view similar to FIG. 12A except that the extension boom assembly has been pivoted to its extended position.
Figure 12A:
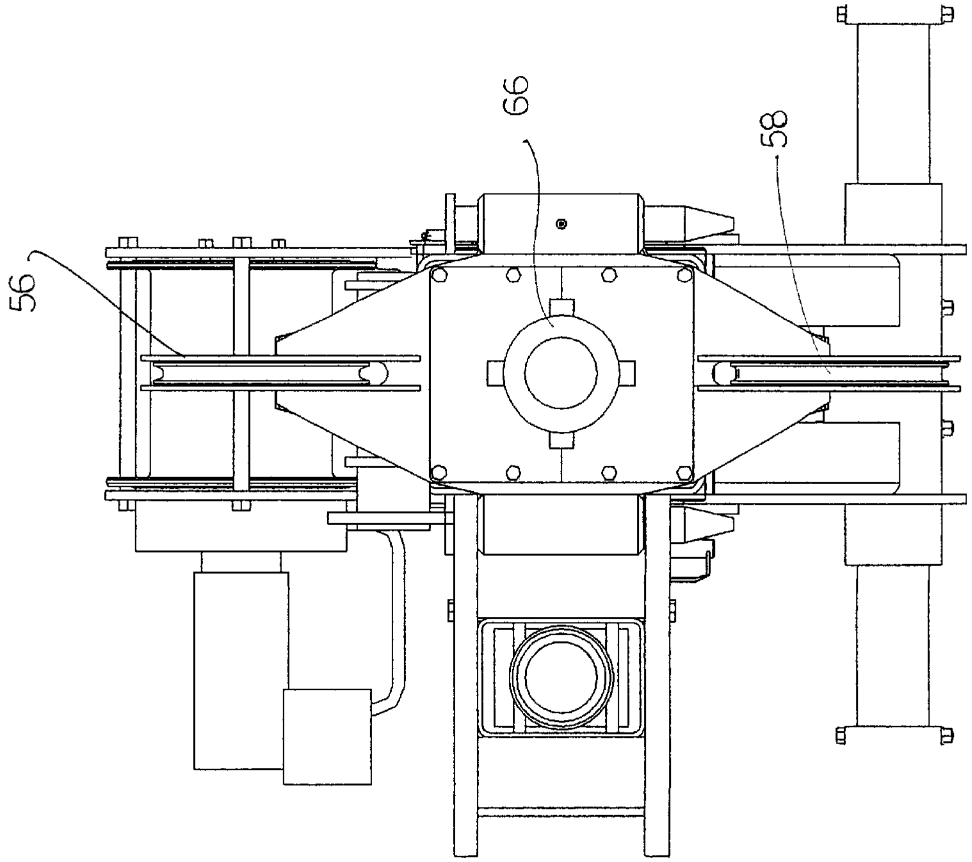
FIG. 12A is an end view of the boom assembly of the parent application with the extension boom boon in its folded position.
Figure 13:
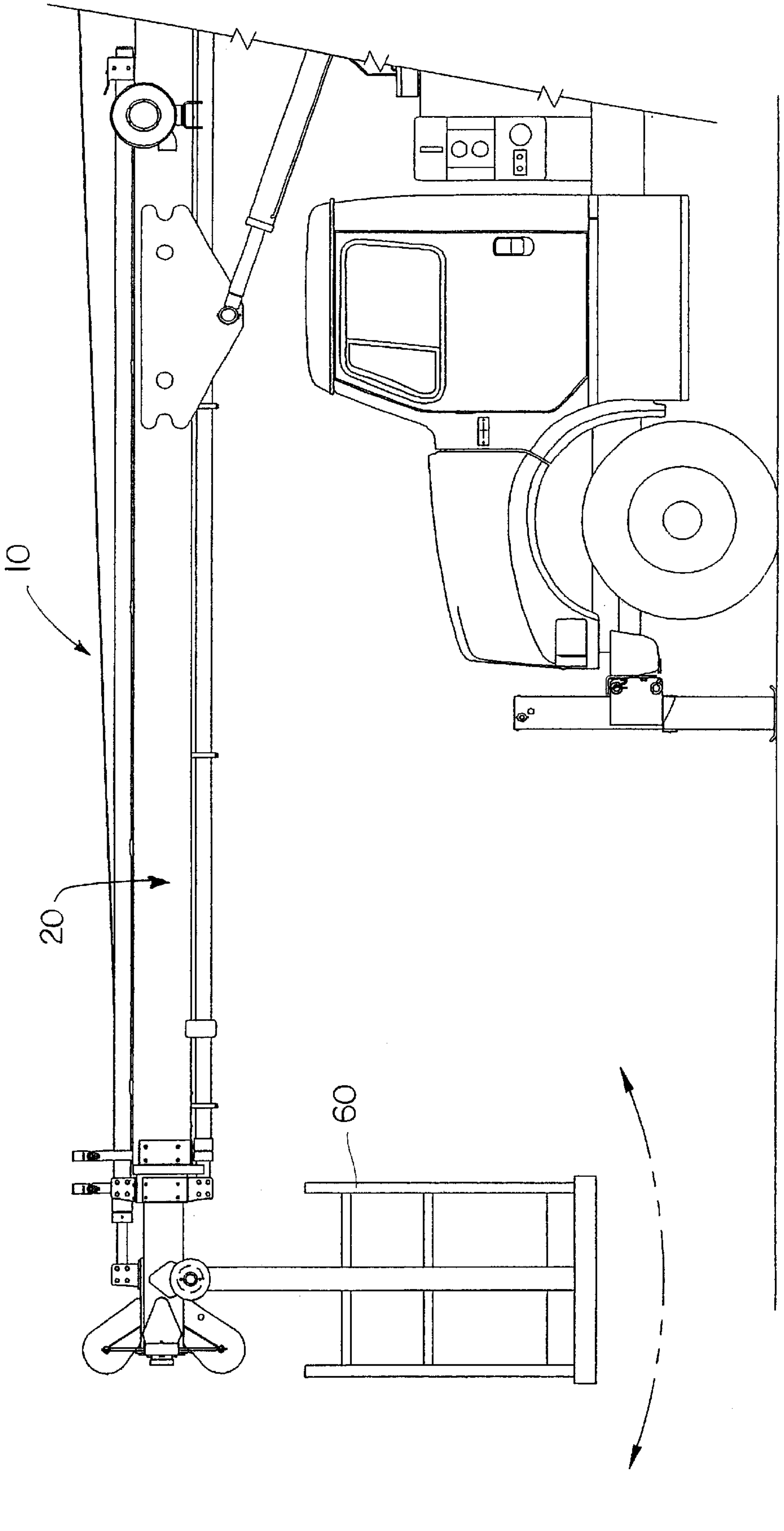
FIG. 13 is a partial side view of the apparatus of the parent application illustrating a basket being supported by the outer end of the boom assembly.
Figure 14:
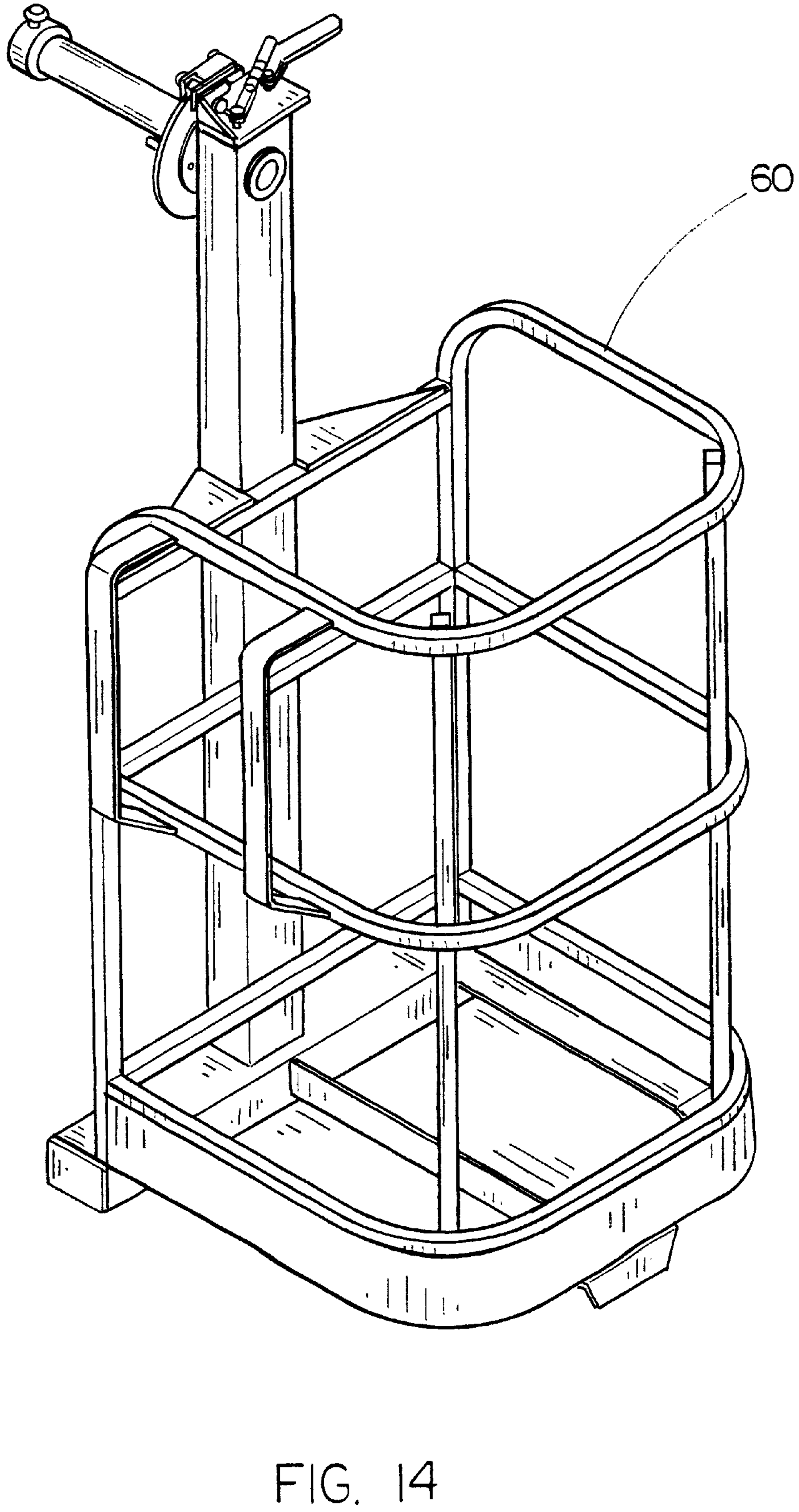
FIG. 14 is a perspective view of the aerial platform which is mounted on the outer end of the boom assembly of the parent application.

A conduit 102 is positioned in the interior of extension boom 76 and has its intake end 104 positioned between the yokes 78 and 80, as seen in FIG. 9. The discharge end 106 of conduit 102 is positioned outwardly of the end of the extension boom 76, as seen in FIG. 10A. If the apparatus is going to pump concrete without utilizing the extension boom 76, an elbow 108 is inserted into the discharge end 66 of conduit 62 with a flexible hose 110 being connected thereto so that concrete may be easily directed into a form 112, as illustrated in FIG. 1. If the extension boom 76 is to be utilized, elbow 108 is removed from discharge end 66 of conduit 62. Pin 84 is then installed in yoke 78, collar 86, and yoke 80. The inner boom section 40 is then partially extended so that arms 90 and 90' clear the receiver 92 and so that the arm 94 clears the receiver 96. Extension boom 76 is then pivotally moved from its folded position illustrated in FIG. 9 to its extended position illustrated in FIGS. 11A and 11B. When the extension boom 76 has been pivoted so to be in an end-to-end relationship with boom assembly 20, pin 82 is extended through yoke 78, collar 88, and yoke 80, which not only maintains extension boom 76 in its operative position, but also places the intake end 104 of conduit 102 in communication with discharge end 66 of conduit 62. Flexible hose or the like is then secured to discharge end 106 of conduit 102 to aid in placing concrete within the concrete form.

The use of the extension boom 76 gives the apparatus much greater reaching capabilities than if the extension boom were not provided. Further, when the extension boom 76 is in its folded position, the boom assembly 20 may be used in conventional fashion. Thus, an apparatus has been provided which serves a dual purpose, that is, as a concrete pumper or as a conventional crane, depending upon whether the extension boom is being utilized. The provision of the aerial platform 60 enables an operator to spray or pump concrete from the hose 110.

When it is desired to discontinue the concrete pumping action through the extension boom 76, pin 82 is removed from yoke 78, collar 88, and yoke 80. The extension boom 76 is then folded to its folded position adjacent boom assembly 20. The boom assembly 20 is then retracted to cause the arms 90 and 90' to be received by the receiver 92 and to cause the arm 94 to be received by the receiver 96. Pin 100 would then be extended through the receiver 96 and the arm 94 to maintain the extension boom 76 in its folded position. The pin 84 is then removed from yoke 78, collar 86, and yoke 80. The intermediate boom section 38 and the inner boom section 40 would then be retracted, which will cause the conduit 62 in boom assembly 20 to move rearwardly therein. At that time, it is necessary for a worker to pull the flexible hose 32 from the rearward end of the boom assembly 20 and coil the same on the platform 16 of the truck. The retracted boom assembly 20 is then placed upon the support 34.

Figure 15:
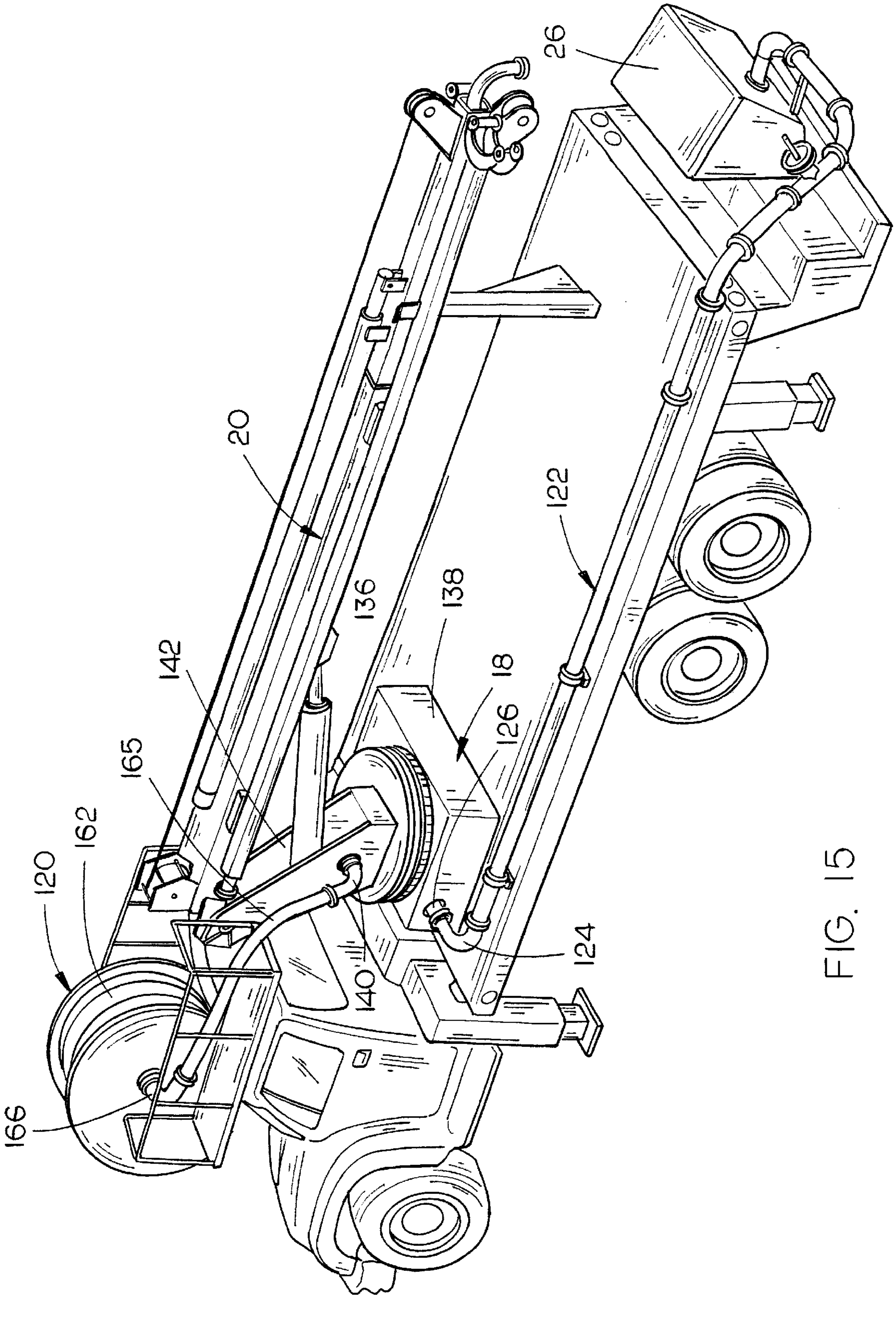
FIG. 15 is a perspective view illustrating the crane-mounted concrete pump apparatus wherein a hose reel is rotatably mounted on the inner end of the telescopic boom assembly.

Referring now to the apparatus of FIGS. 15–22, the apparatus shown therein is identical to that shown in FIGS. 1–14 except that the flexible hose 32 in the apparatus of FIGS. 1–14 which connects the concrete pump 26 to the inner end 64 of the concrete conduit 62 is omitted and a hose reel assembly, generally referred to by the reference numeral 120, is mounted on the inner or rearward end of the telescopic boom assembly 20. In FIG. 15, the numeral 122 refers to a concrete conduit which has its intake end operatively connected to the discharge side of the concrete pump 26 and which has its forward end connected to an elbow 124. The inner end of elbow 124 is secured to a pipe stub 126 which is supported from the truck platform by a bracket 128. The inner end of pipe stub 126 is connected to the lower end of an elbow 130. The upper end of elbow 130 is connected to the lower end of an elbow 132 by a rotatable connection, referred to generally by the reference numeral 134, so that the upper end 136 of the pedestal 18 may rotate with respect to the lower pedestal portion 138. The upper end of elbow 132 is secured to the lower end of an elbow 140 which is secured to the support frame 142 of the pedestal 18 to which the inner end of the boom assembly 20 is pivotally connected. The apparatus of FIGS. 1–14 is shown to have a pair of hydraulic cylinders 24 and 24' while the apparatus of FIGS. 15–22 is shown to have a single hydraulic cylinder 24. The number of cylinders corresponding to hydraulic cylinder 24 may be one or two, depending upon the particular structure of the crane.

Figure 16:
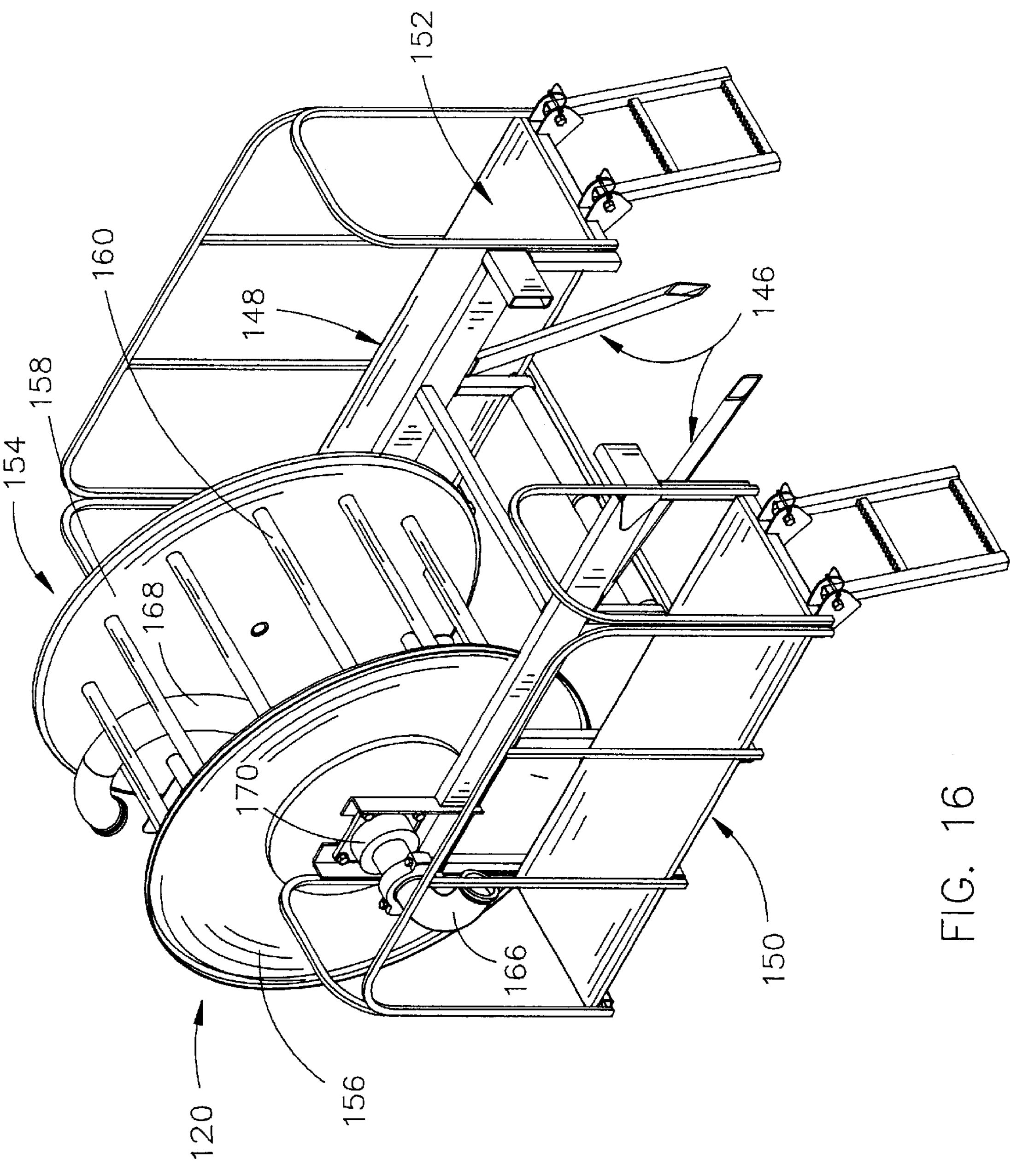
FIG. 16 is a perspective view of the hose reel assembly.
Figure 17:
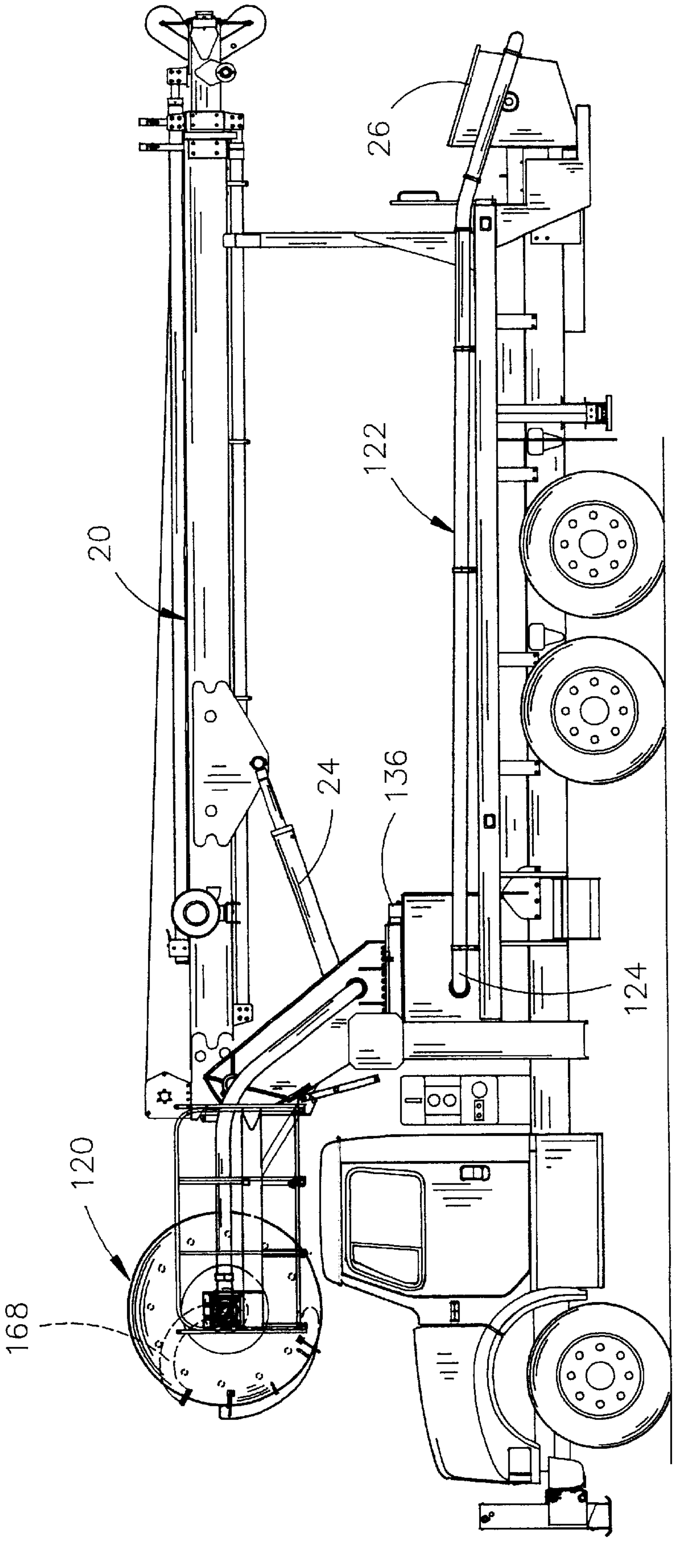
FIG. 17 is a side elevational view of the apparatus of FIG. 15.
Figure 18:
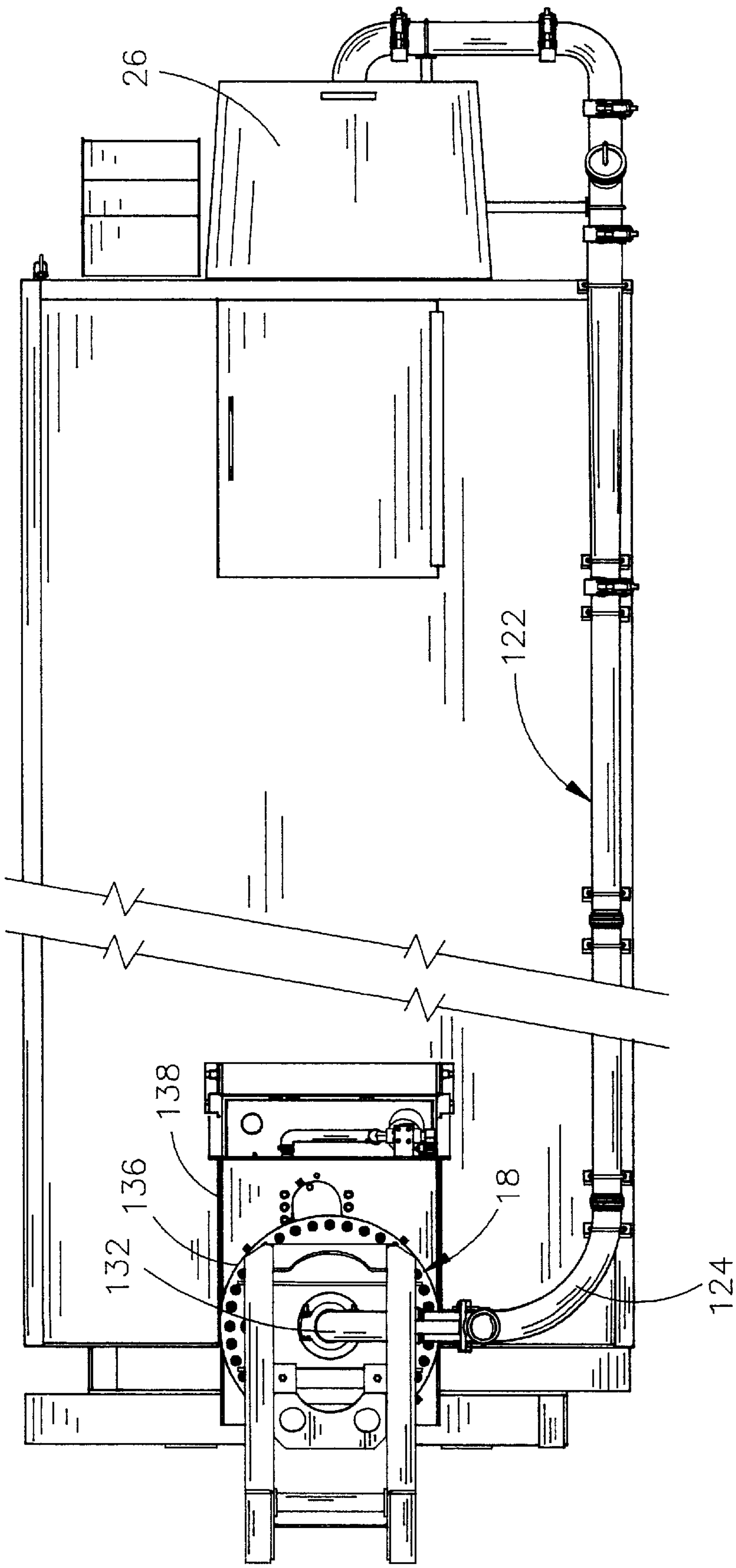
FIG. 18 is a partial top view of the apparatus of FIG. 15.
Figure 19:
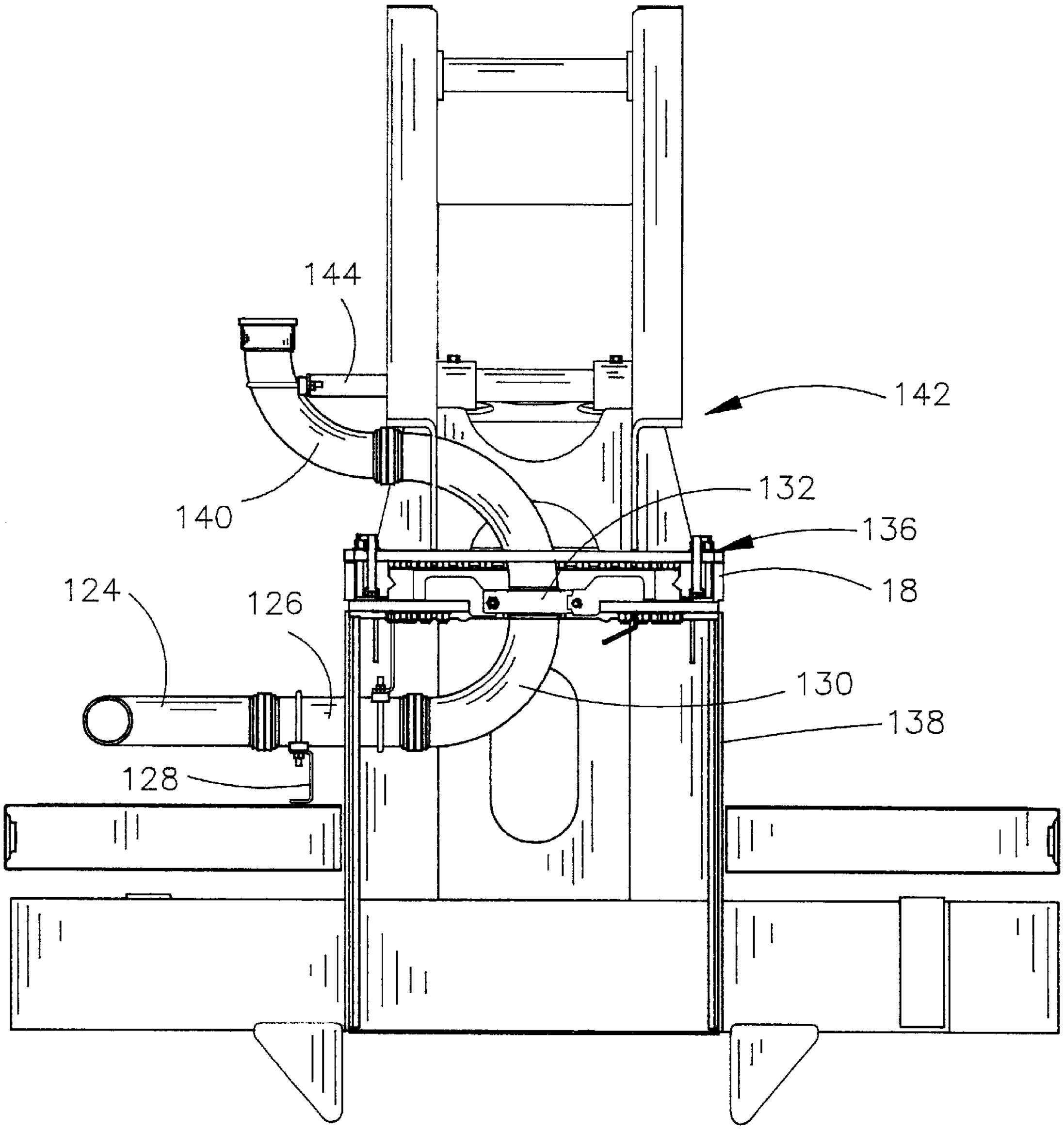
FIG. 19 is a partial vertical sectional view of the hose reel and pedestal.
Figure 20:
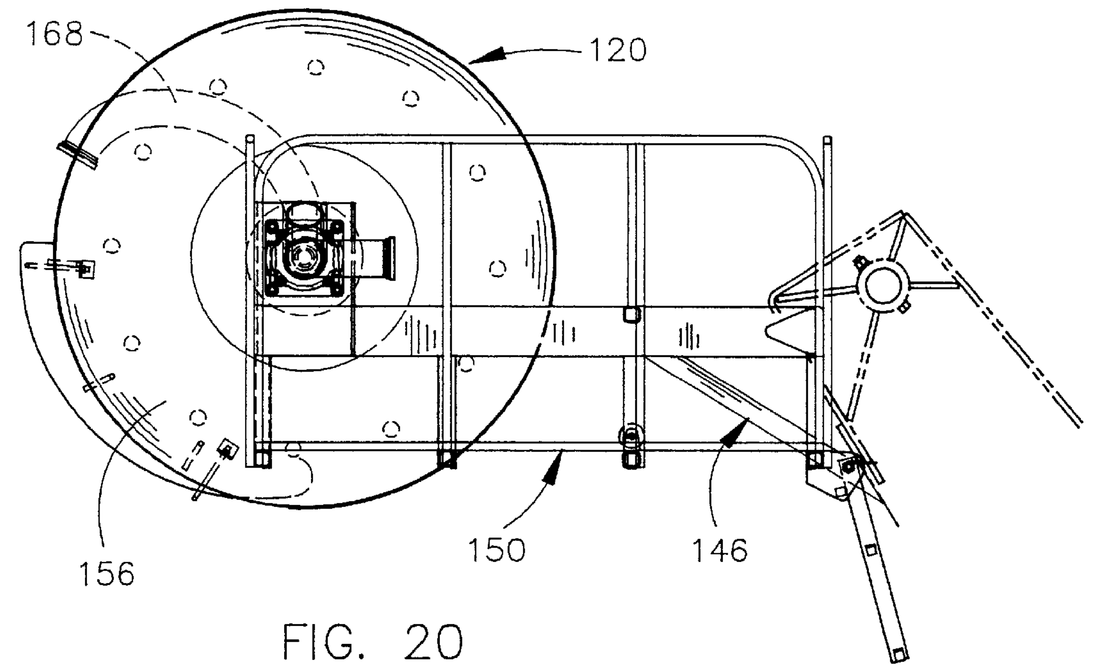
FIG. 20 is a partial side elevational view of the hose reel.
Figure 21:
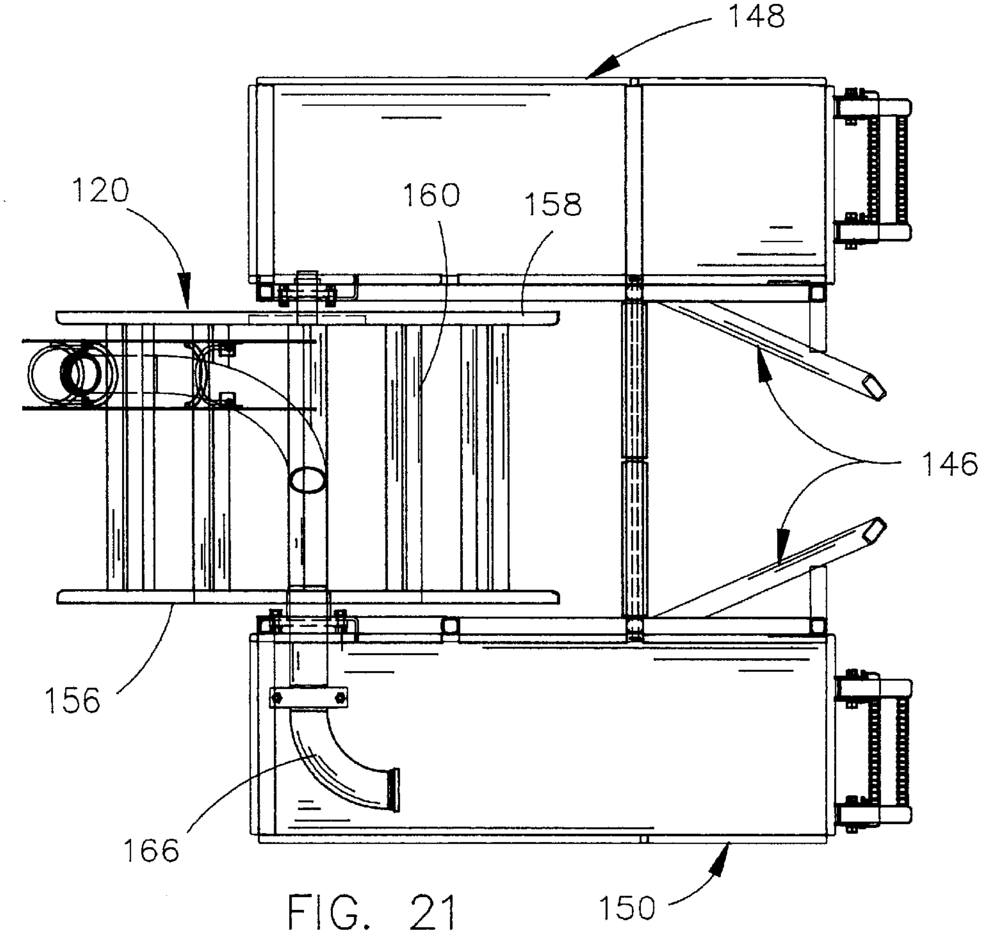
FIG. 21 is a partial top elevational view of the hose reel assembly.

Reel assembly 120 is secured to the support frame 142 by framework 146 (FIG. 16). For purposes of description, the hose reel assembly 120 will be described as including a framework 148 including a pair of side platforms 150 and 152. Hose reel assembly 120 includes a hose reel 154 comprising spaced-apart ends 156 and 158 having spaced-apart rods or pipes 160 secured thereto and extending therebetween upon which the flexible concrete hose 162 is wound, as will be described in more detail hereinafter.

Figure 22:
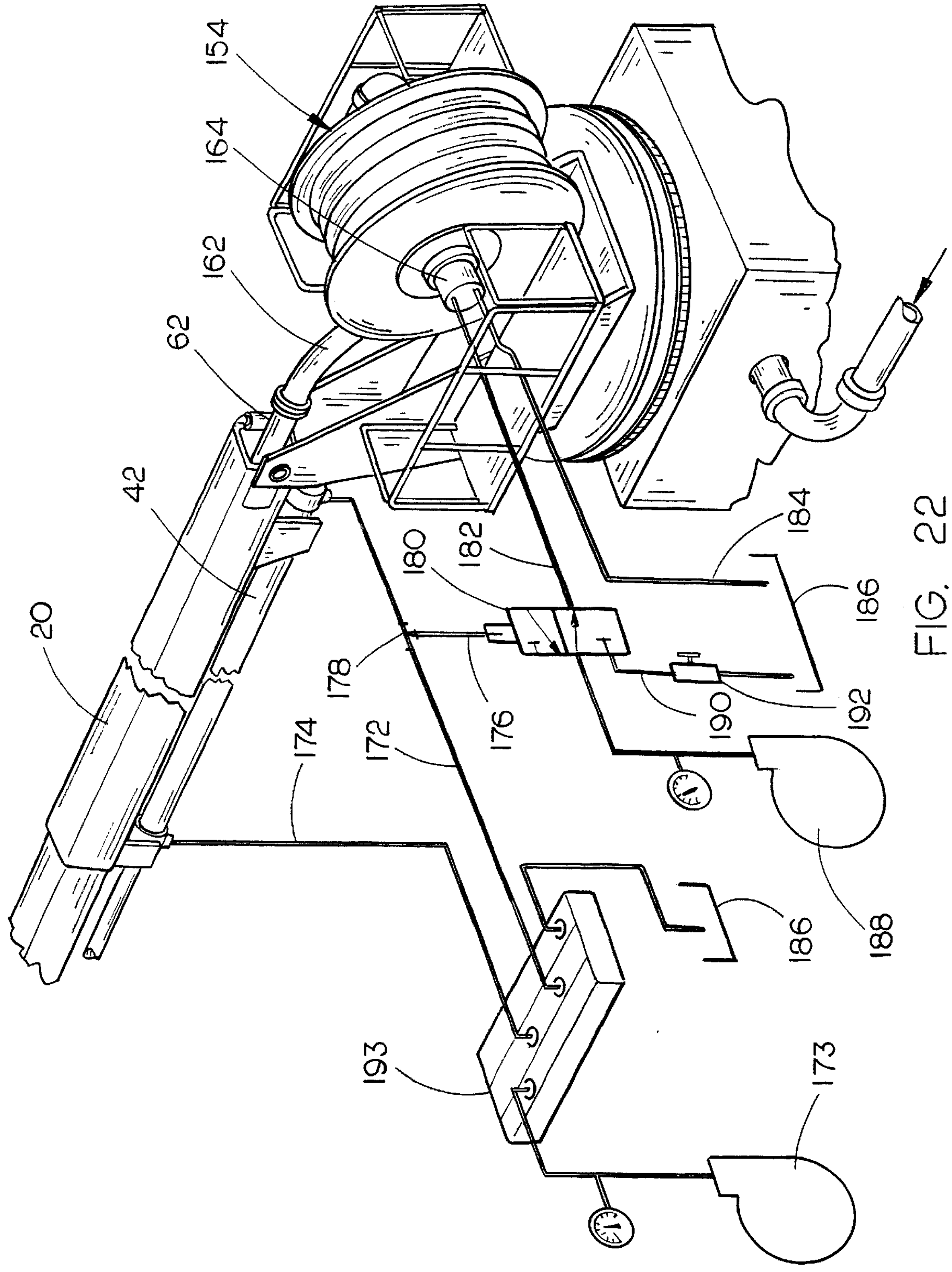
FIG. 22 is a perspective view and schematic illustrating the manner in which the rotatable hose reel is fluidly connected to the hydraulic cylinder circuit which extends and retracts the telescopic boom assembly.

Reel 154 is rotatably mounted on the framework 148 about a horizontal axis and is driven in at least one direction by a hydraulic motor 164 operatively secured thereto, as seen in FIG. 22. Flexible hose 165 is secured to the upper end of elbow 140 and extends upwardly and forwardly for connection to an elbow 166. The inner end of elbow 166 is connected to one end of an arcuate hose or pipe 168 by a rotatable connection, referred to generally by the reference numeral 170. The other end of pipe or hose 168 is connected to the inner end of flexible concrete hose 162. The other end of hose 162 is connected to the rearward end of concrete conduit 62 which is preferably positioned within the interior of the telescopic boom assembly but which could be mounted on the outside thereof if the situation so dictates.

As seen in FIG. 22, the double-acting hydraulic cylinder 42, which is employed to extend and retract the boom assembly 20, has a hydraulic line 172 connected to its base end and a hydraulic line 174 connected to its rod end. The lines 172 and 174 are connected to a hydraulic pump 173 through a directional control valve 193, to enable the hydraulic cylinder 42 to be extended and retracted.

Hydraulic line 176 is tapped into line 172 at 178 and extends to a normally open, three-way valve 180. Hydraulic line 182 extends from valve 180 to hydraulic motor 164, as seen in FIG. 22. As also seen in FIG. 22, return line 184 extends from hydraulic motor 164 to reservoir 186. The inlet side of valve 180 is connected to a source of hydraulic fluid under pressure, such as a hydraulic pump which is referred to generally by the reference numeral 188. Line 190, having a manually adjustable valve 192 imposed therein, extends from valve 180 to the reservoir 186, as seen in FIG. 22. As stated, valve 180 is normally open so that pump 188 may pump hydraulic fluid through valve 180 to hydraulic motor 164 to cause the reel 154 to rotate to wind the hose 162 thereon.

Thus, when hydraulic fluid is being forced through conduit 172 to the base end of hydraulic cylinder 42 to extend the boom assembly 20, hydraulic fluid passes from line 172 into line 176 to switch the valve 180 to its neutral position so that motor 164 is in a neutral or freewheeling position. As the boom assembly 20 is extended, the concrete conduit 62 moves outwardly through the interior of the boom assembly 20 and pulls the flexible hose 162 from the freewheeling hose reel 154. When it is desired to retract the boom assembly 20, hydraulic fluid is forced into the rod end of the hydraulic cylinder 42 through the line 174 with the hydraulic fluid in the cylinder 42 returning to the reservoir 186 by means of the line 172. During the retraction of the cylinder 42, the pressure in line 176 is relieved so that the valve 180 switches to its normally closed position so that hydraulic motor 164 is activated to cause reel 154 to rotate to wind the hose 162 thereon. Thus, as the concrete conduit 62 is moved rearwardly as the boom assembly 20 is being retracted, the flexible concrete hose 162 is wound upon the rotating hose reel 154, thereby eliminating the need for the hose 162 to be manually pulled rearwardly onto the truck platform as in the apparatus of FIGS. 1–14. The flexible concrete hose 162 is conveniently wound upon and stored on the hose reel assembly which provides a less obstructed platform area.

Thus it can be seen that the invention accomplishes at least all of its stated objectives.

We claim:

1. In combination:

a truck comprising a wheeled frame having rearward and forward ends, and a cab mounted on the forward end of said wheeled frame;

a rotatable pedestal assembly mounted on said wheeled frame rearwardly of said cab;

a telescopic boom assembly, having inner and outer ends, having its inner end pivotally secured, about a horizontal axis, to said pedestal;

a first hydraulic cylinder means pivotally connecting said telescopic boom assembly to said pedestal for pivotally moving said telescopic boom assembly with respect to said pedestal;

an elongated first concrete conduit mounted on said telescopic boom assembly having a discharge end positioned at the outer end of said telescopic boom assembly and having an intake end positioned at said inner end of said telescopic boom assembly;

a rotatable hose reel positioned at the inner end of said boom assembly;

a flexible concrete hose wound upon said hose reel and having an intake end and a discharge end;

said discharge end of said flexible concrete hose being in communication with said intake end of said first concrete conduit;

said intake end of said flexible concrete hose being in communication with a source of concrete under pressure whereby concrete may be pumped through said flexible concrete hose, through said first concrete conduit on said telescopic boom assembly to said discharge end of said first concrete conduit;

said hose reel permitting said flexible hose to unwind therefrom as said telescopic boom assembly is extended;

said hose reel winding said flexible hose thereon as said telescopic boom assembly is retracted.

2. The combination of claim 1 wherein said hose reel is secured to said pedestal for movement therewith.

3. The combination of claim 1 wherein a first hydraulic motor is connected to said hose reel for winding said flexible concrete hose thereupon as said telescopic boom assembly is retracted.

4. The combination of claim 3 further including means for placing said first hydraulic motor in a neutral condition to permit said flexible concrete hose to freely unwind from said hose reel as said telescopic boom assembly is extended.

5. The combination of claim 1 wherein a second concrete conduit, having intake and discharge ends, is positioned on said wheeled frame with the intake end thereof being in communication with the source of concrete under pressure; said pedestal including a third concrete conduit, having intake and discharge ends, mounted thereon with the intake end thereof being in communication with the discharge end of said second concrete conduit; said third concrete conduit including rotational means for permitting said pedestal assembly and said third concrete conduit to rotate with respect to said second concrete conduit; said discharge end of said third concrete conduit being in operative communication with said intake end of said flexible hose.

6. The combination of claim 1 wherein said first concrete conduit is positioned within said telescopic boom assembly.

7. The combination of claim 4 wherein said hydraulic motor is operatively connected to a control valve which is in communication with a first hydraulic pump and wherein a second hydraulic cylinder is provided on the telescopic boom assembly for extending and retracting said boom assembly; said second hydraulic cylinder having a base end and a rod end; a first hydraulic line connected to said second hydraulic cylinder at its said base end which is in communication with a bidirectional valve operatively connected to a second hydraulic pump; a second hydraulic line connected to said second hydraulic cylinder at its rod end which is in communication with said bidirectional valve; said control valve normally being in a closed position so that said first hydraulic pump may supply hydraulic fluid through said control valve to said hydraulic motor; said control valve being connected to said first hydraulic line so that when said second hydraulic cylinder is extending, the hydraulic pressure in said first hydraulic line will cause said control valve to switch to a neutral position so that said hydraulic motor will be in a neutral position as said boom assembly is extending.

* * * * *